(12) United States Patent
Lager et al.

(10) Patent No.: US 10,912,384 B2
(45) Date of Patent: Feb. 9, 2021

(54) FURNITURE TIP OVER PREVENTION SYSTEM

(71) Applicants: Bengt Lager, Kennesaw, GA (US); Jesper Andersen, Ry (DK)

(72) Inventors: Bengt Lager, Kennesaw, GA (US); Jesper Andersen, Ry (DK)

(*) Notice: Subject to any disclaimer, the term of this patent is extended or adjusted under 35 U.S.C. 154(b) by 0 days.

(21) Appl. No.: 16/093,045

(22) PCT Filed: Apr. 13, 2017

(86) PCT No.: PCT/US2017/027431
§ 371 (c)(1),
(2) Date: Oct. 11, 2018

(87) PCT Pub. No.: WO2017/180881
PCT Pub. Date: Oct. 19, 2017

(65) Prior Publication Data
US 2019/0150617 A1 May 23, 2019

Related U.S. Application Data

(60) Provisional application No. 62/322,442, filed on Apr. 14, 2016.

(51) Int. Cl.
A47B 97/00 (2006.01)
A44B 11/00 (2006.01)
F16M 13/02 (2006.01)

(52) U.S. Cl.
CPC .............. A47B 97/00 (2013.01); A44B 11/00 (2013.01); F16M 13/02 (2013.01); A47B 2097/008 (2013.01)

(58) Field of Classification Search
CPC ... A47B 97/00; A47B 2097/008; A47B 91/08; F16M 13/02; B61D 45/001;
(Continued)

(56) References Cited

U.S. PATENT DOCUMENTS 4,485,995 A * 12/1984 Hogg ..................... A47F 5/0823
248/218.1
4,509,713 A * 4/1985 Hogg ....................... A47G 1/20
248/217.4

(Continued)

OTHER PUBLICATIONS definition of "integrated" taken from www.merriam-webster.com/dicitonary.*

(Continued)

Primary Examiner — Christopher Garft
(74) Attorney, Agent, or Firm — Thomas | Horstemeyer, LLP

(57) ABSTRACT

Various examples of methods and systems are provided for furniture tip over prevention. In one example, a system includes a furniture mounting bracket configured to be secured to a piece of furniture; a wall anchor plate configured to be secured to a wall adjacent to a back surface of the piece of furniture and below the top of the piece of furniture; and a securing device attached to the wall anchor plate, the securing device configured to detachably attach to the furniture mounting bracket via a quick release. In another example, a method includes securing a wall anchor plate to a wall using mounting wires; attaching a furniture mounting bracket to a piece of furniture; positioning the piece of furniture adjacent to the wall anchor plate; and tensioning a securing device attached between the wall anchor plate and the furniture mounting bracket thereby preventing the furniture from tipping over.

20 Claims, 22 Drawing Sheets

(58) Field of Classification Search
CPC ... E05B 73/0005; A44B 11/00; A44B 11/125; F16B 15/00; F16B 15/06; F16B 13/002; F16B 5/06; F16B 13/126; F16B 13/04; F16B 2/24; A47G 1/20; A47G 1/22
See application file for complete search history.

(56) References Cited

U.S. PATENT DOCUMENTS

| | | | | |
|---|---|---|---|---|
| 4,619,430 | A * | 10/1986 | Hogg | A47F 5/0823 |
| | | | | 248/216.1 |
| 5,197,706 | A * | 3/1993 | Braithwaite | E05B 73/0005 |
| | | | | 248/499 |
| 5,701,715 | A * | 12/1997 | Masters | E04B 1/34347 |
| | | | | 52/698 |
| 6,220,562 | B1 | 4/2001 | Konkle | |
| 7,175,535 | B1 * | 2/2007 | Marmentini | A47D 13/025 |
| | | | | 297/273 |
| 9,987,966 | B2 * | 6/2018 | Diederiks | B60P 7/0807 |
| 2005/0218284 | A1 | 10/2005 | Kurrasch | |
| 2006/0097123 | A1 * | 5/2006 | Gallien | A47B 97/00 |
| | | | | 248/500 |
| 2008/0265123 | A1 * | 10/2008 | Repac | A47G 1/20 |
| | | | | 248/546 |
| 2008/0290231 | A1 * | 11/2008 | Repac | A47B 96/028 |
| | | | | 248/217.4 |
| 2009/0173848 | A1 | 7/2009 | Green | |
| 2013/0087675 | A1 * | 4/2013 | Miller | A47B 97/00 |
| | | | | 248/499 |
| 2014/0047693 | A1 * | 2/2014 | Cassidy | F16M 11/22 |
| | | | | 29/428 |

OTHER PUBLICATIONS

International Search Report and Written Opinion in related, co-pending PCT Application No. PCT/US17/27431, dated Jul. 13, 2017.

Office Action dated Apr. 15, 2020 for Chinese Application No. 201780030085X.

* cited by examiner

FIG. 1F  FIG. 1G  FIG. 1H

FURNITURE TIP OVER PREVENTION SYSTEM

CROSS REFERENCE TO RELATED APPLICATIONS

This application is the 35 U.S.C. § 371 national stage application of PCT Application No. PCT/US2017/027431, filed Apr. 13, 2017, where the PCT claims priority to, and the benefit of, U.S. provisional application entitled "Furniture Tip Over Prevention System" having Ser. No. 62/322,442, filed Apr. 14, 2016, both of which are hereby incorporated by reference in their entireties.

BACKGROUND

Thousands of individuals are injured by furniture tipping over every year. For example, it is not uncommon for children to climb on a dresser using the drawers as steps. Such unbalance can cause the dresser to tip over onto the child resulting in injury, and in some cases, death. Heavily loaded drawers can also cause furniture to become unbalanced, causing the furniture to tip over onto the individual opening the drawer. A wide range of injuries can result.

SUMMARY

Aspects of the present disclosure are related to prevention of furniture tip over. In one aspect, among others, a furniture tip over prevention system comprises a furniture mounting bracket configured to be secured to a piece of furniture; a wall anchor plate configured to be secured to a wall adjacent to a back surface of the piece of furniture and below the top of the piece of furniture; and a securing device attached to the wall anchor plate, the securing device configured to detachably attach to the furniture mounting bracket via a quick release. In one or more aspects, the wall anchor plate can be secured to the wall by mounting wires that extend through an outer surface of the wall. The mounting wires can pass through corresponding openings of the wall anchor plate and a portion of drywall defining the outer surface of the wall to secure the wall anchor plate against the outer surface of the wall. The mounting wires can comprise a curved section configured to pass through the portion of drywall and engage an inner surface of the wall at a distal end to secure the wall anchor plate against the outer surface of the wall.

In one or more aspects, the mounting wires can be configured to detachably attach to the wall anchor plate to hold the distal end of the curved section against the inner surface of the wall. The mounting wires can comprise a straight section at a proximal end of the curved section, where the straight section engages with a clamp of the wall anchor plate to detachably attach that mounting wire to the wall anchor plate. The straight section can clip under the clamp to detachably attach that mounting wire. The straight section can be substantially perpendicular to the proximal end of the curved section. The curved section of a first mounting wire can engage the inner surface of the wall on a first side of the wall anchor plate and the curved section of a second mounting wire can engage the inner surface of the wall on a second side of the wall anchor plate that is opposite the first side.

In one or more aspects, the securing device can be a strap. The quick release can be directly mounted to or integrated with the furniture mounting bracket. The quick release can be a cam lock release buckle. In one or more aspects, the furniture tip over prevention system can comprise a cover configured to detachably attach to the furniture mounting bracket, the cover configured to restrict access to the quick release when attached to the furniture mounting bracket. The securing device can be attached to a cross-bar of the wall anchor plate.

In another aspect, a method comprises securing a wall anchor plate to a wall using mounting wires that extend through an outer surface of the wall; attaching a furniture mounting bracket to a piece of furniture, where a securing device is attached between the wall anchor plate and the furniture mounting bracket; positioning the piece of furniture adjacent to the wall anchor plate; and tensioning the securing device thereby preventing the piece of furniture from tipping over. In one or more aspects, the wall anchor plate can be secured to the wall by mounting wires passing through corresponding openings of the wall anchor plate and a portion of the wall to secure the wall anchor plate against an outer surface of the wall. The furniture mounting bracket can be secured to the back surface adjacent to a top surface of the piece of furniture and the wall anchor plate can be secured to the wall at a location adjacent to the back of the piece of furniture and below the top of the piece of furniture. The furniture mounting bracket can be positioned above the wall anchor plate. The securing device can be a strap extending from the wall anchor plate to the furniture mounting bracket. In one or more aspects, the method can comprise securing the furniture mounting bracket to the piece of furniture.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A through 1I illustrate examples of various components of an anti-tip system, in accordance with various embodiments of the present disclosure.

DETAILED DESCRIPTION

Figure 1A:
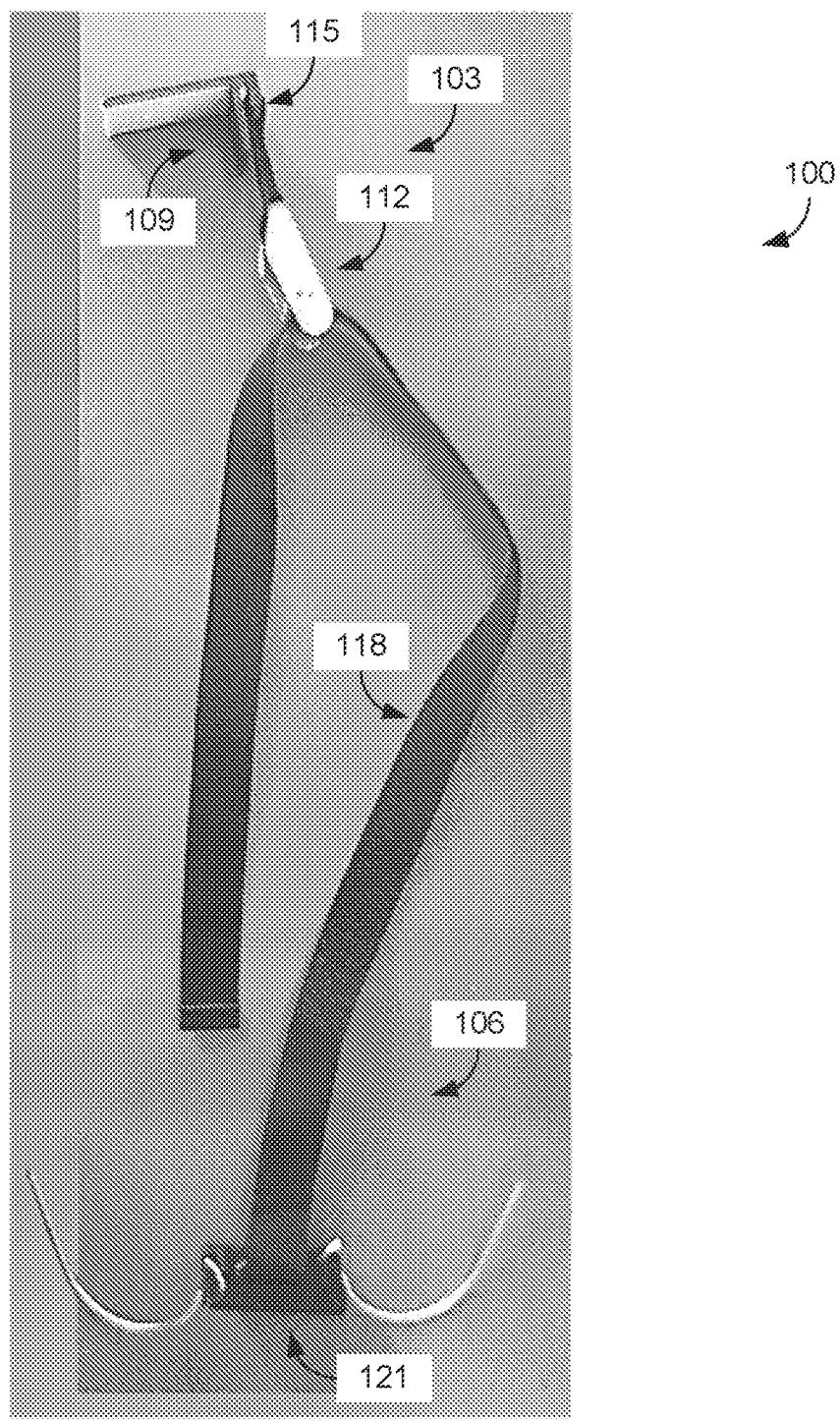

Disclosed herein are various embodiments of systems, methods and apparatus related to prevention of furniture tip over. Reference will now be made in detail to the description of the embodiments as illustrated in the drawings, wherein like reference numbers indicate like parts throughout the several views.

Figure 1B:
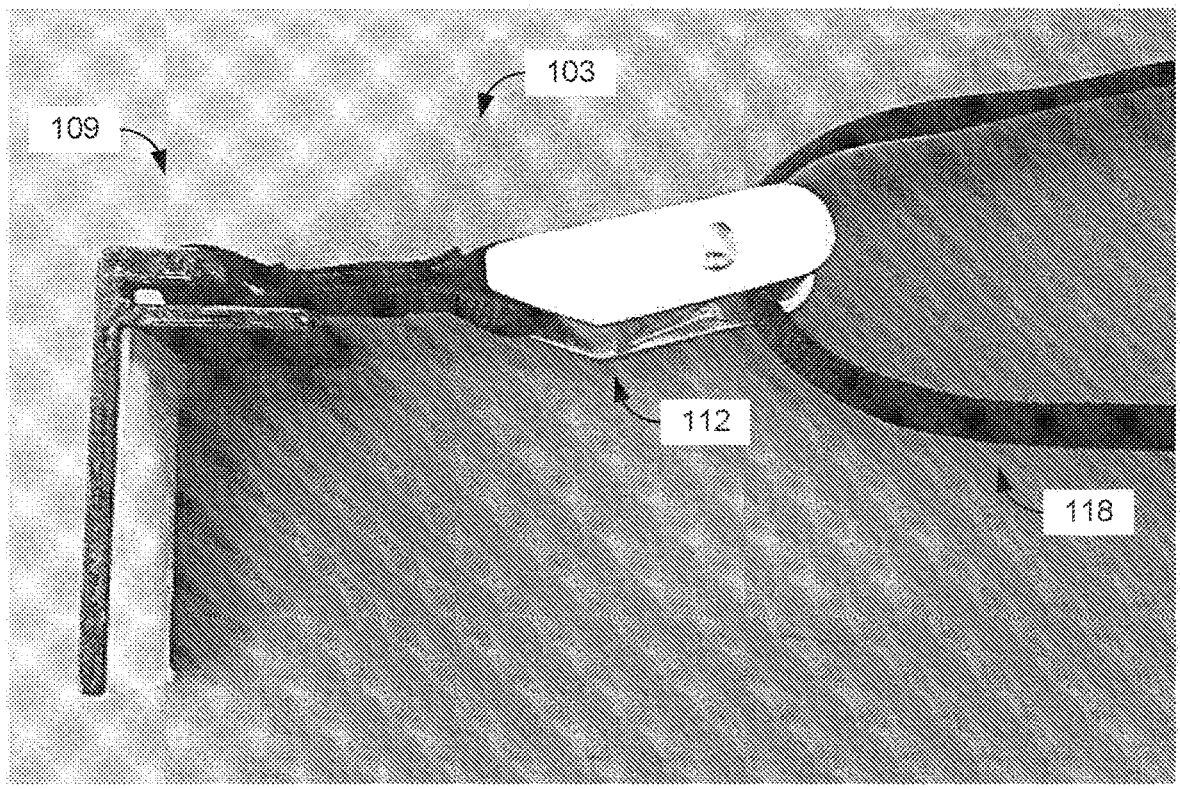

Referring to FIG. 1A, shown is an image of an example of an anti-tip system 100. The anti-tip system 100 includes a furniture mounting unit 103 and a wall mounting unit 106. The furniture mounting unit 103 includes a furniture mounting bracket 109 configured to be secured to the upper rear portion of a piece of furniture and a quick release 112 (e.g., a cam lock, snap release buckle, tension fastener, or other suitable secure and release mechanism) attached to the furniture mounting bracket 109. As shown in the example of FIG. 1A, the quick release 112 can be attached to the furniture mounting bracket 109 via a piece of strapping or other appropriate connector. For example, a piece of strap may pass through one end of the quick release 112 and over an attachment bar 115 of the furniture mounting bracket 109, with the ends sewn together as shown in the image of FIG. 1B. In some embodiments, a metal link may be secured or connected at one end to the furniture mounting bracket 109 and secured or connected at the other end to the quick release 112. In other embodiments, the quick release 112 can be directly attached to the furniture mounting bracket 109.

Figure 1C:
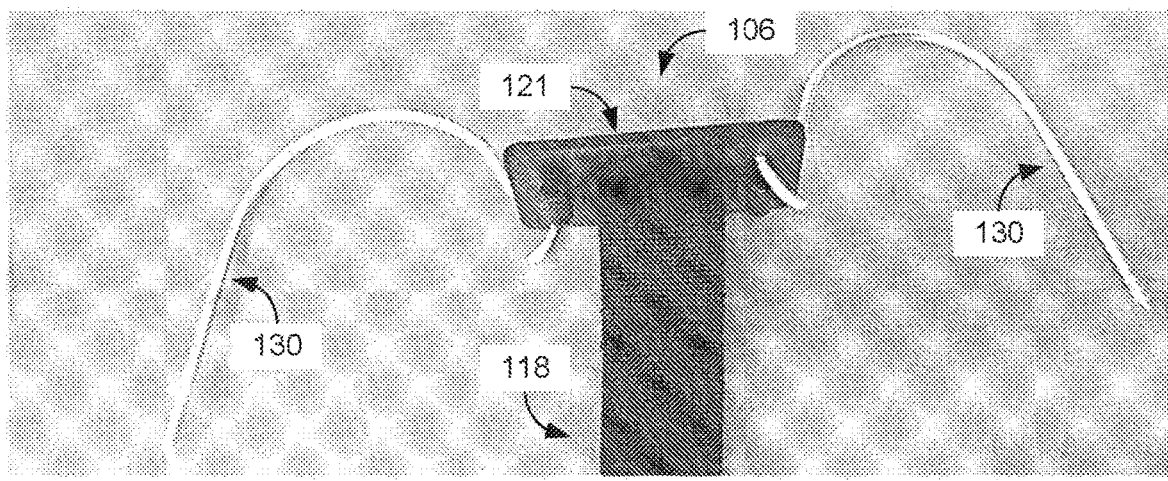
Figure 1D:
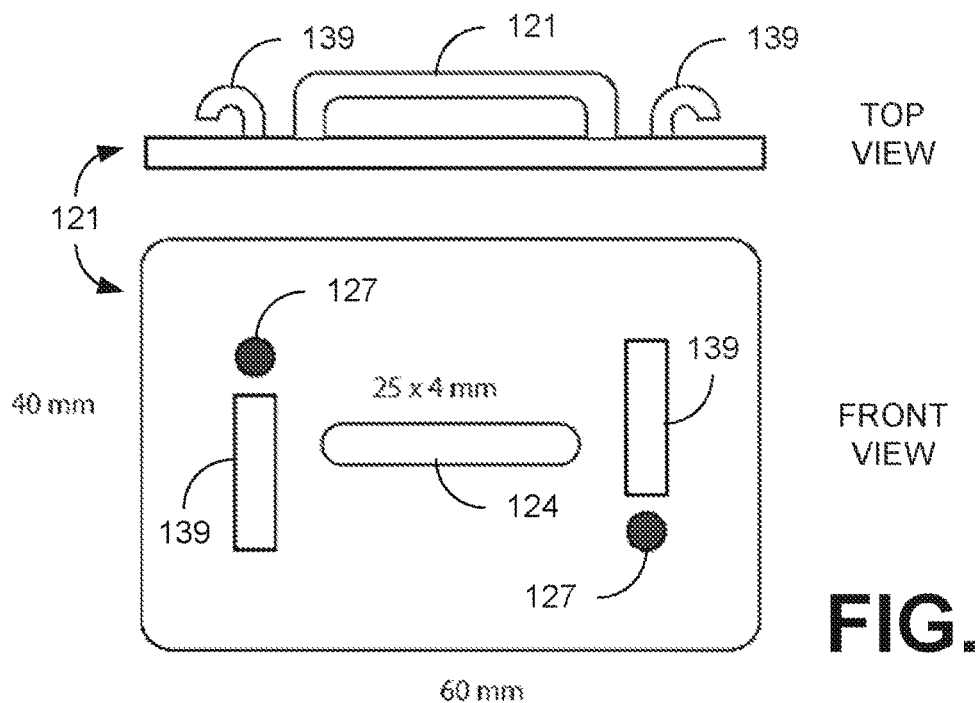
Figure 1E:
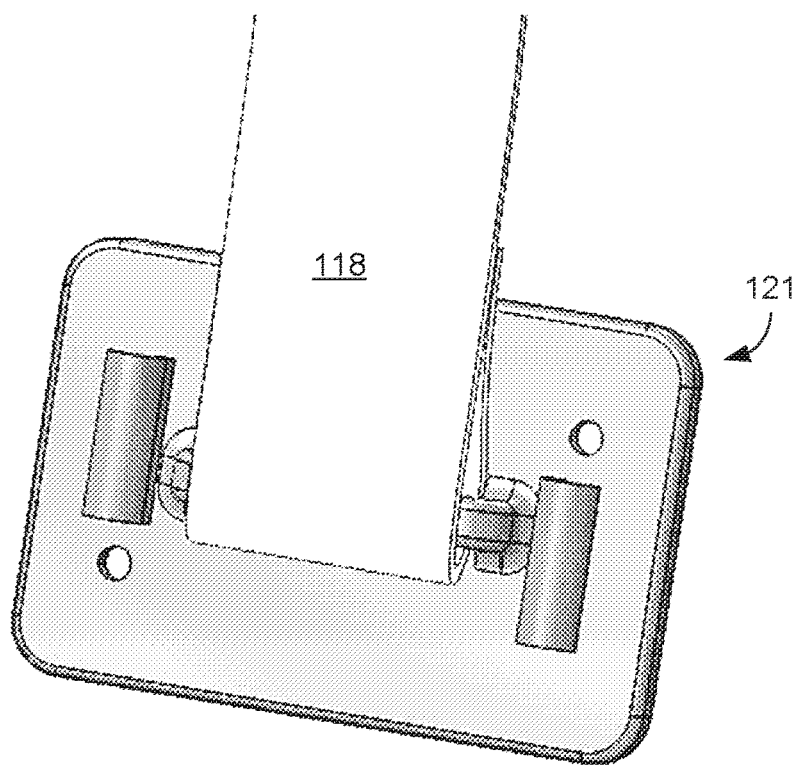

As shown in the image of FIG. 1C, the wall mounting unit 106 includes a strap 118 (or other securing device) attached to a wall anchor plate 121. The quick release 112 is configured to receive the strap 118 and hold it in position when tightened. The strap 118 can be attached to the wall anchor plate 121 by, e.g., a cross-bar 124 extending across a center portion of the wall anchor plate 121 as shown in FIG. 1D. For example, the strap 118 can be folded over the cross-bar 124 and sewn to secure the strap 118 on the cross-bar 124 as shown in FIG. 1E.

Figure 1I:
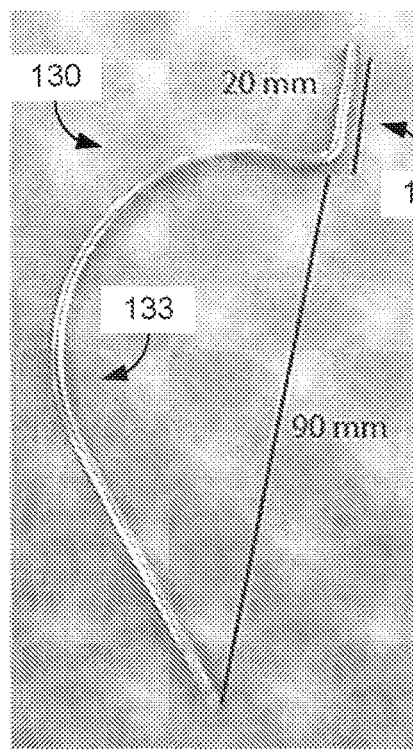
Figure 1I:
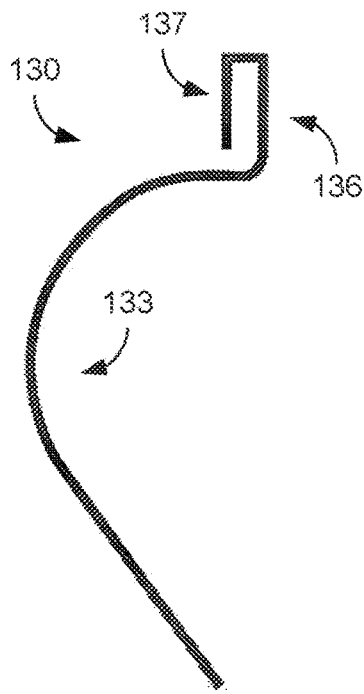
Figure 1I:
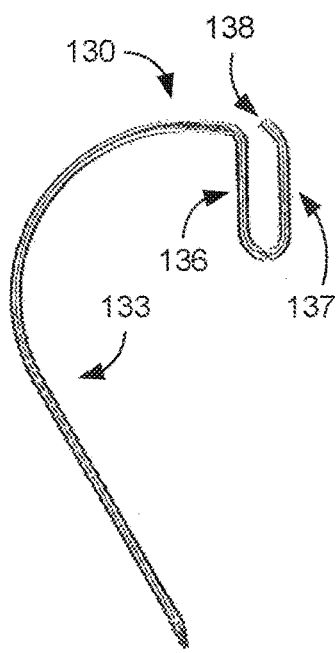
Figure 1I:
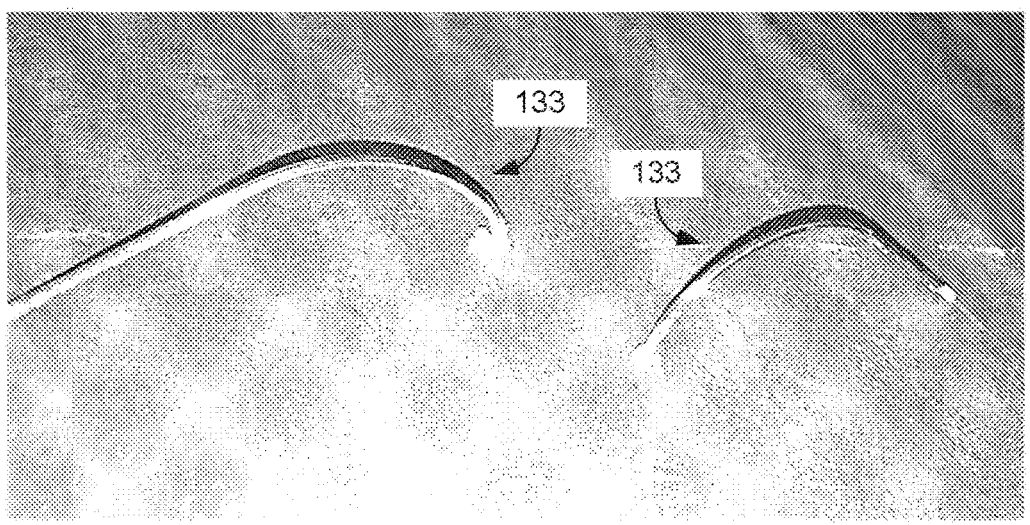

In addition, the wall anchor plate 121 includes holes or openings 127 to allow mounting wires 130 to pass through the wall anchor plate 121 and enter the drywall (plasterboard, wallboard, or gypsum board) to secure the wall anchor plate 121 in place. As illustrated in FIGS. 1F, 1G and 1H, a mounting wire 130 includes a curved section 133 that extends through the drywall and a straight section 136 that is substantially perpendicular to the end of the curved section 133. During installation of the wall mounting unit 106, the free end of the curved section 133 opposite to the straight section 136 is aligned with an opening 127 in the wall anchor plate 121 and forced through the drywall until the straight section 136 is flush with the face of the wall anchor plate 121. With the curved section 133 inserted through the drywall, the free end of the curved section 133 presses against the back of the drywall as shown in FIG. 1I.

The straight section 136 can then be clipped behind (or under) clamps 139 (FIG. 1D) on the wall anchor plate 121 to secure the mounting wire 130, and thus the wall anchor plate 121, in position on the wall. The mounting wire 130 in FIG. 1F comprises a single straight portion 136 that fits under the clamp 139. The mounting wire 130 in FIG. 1G adds a second straight portion 137 in parallel with the first straight portion 136 that clips under the clamp 139. The second straight portion 137 can fit over the clamp 139 to facilitate removal of the mounting wire 130 from the clamp 139. The mounting wire 130 in FIG. 1H also includes a second straight portion 137 in parallel with the first straight portion 136, but the straight sections 136 and 137 are folded in the opposite direction (e.g., over the curved section 133). The first straight portion 136 clips under the clamp 139, while the second straight portion 137 fits over the clamp 139. The bent end 138 can help prevent the mounting wire 130 from moving on the clamp 139. Other arrangements may also be possible. With the straight section 136 clamped in place, the two mounting wires 130 hold the wall anchor plate 121 in position on the wall with the curved section 133 of one mounting wire 130 extending upward inside the wall and the curved section 133 of the other mounting wire 130 extending downward inside the wall.

Figure 2A:
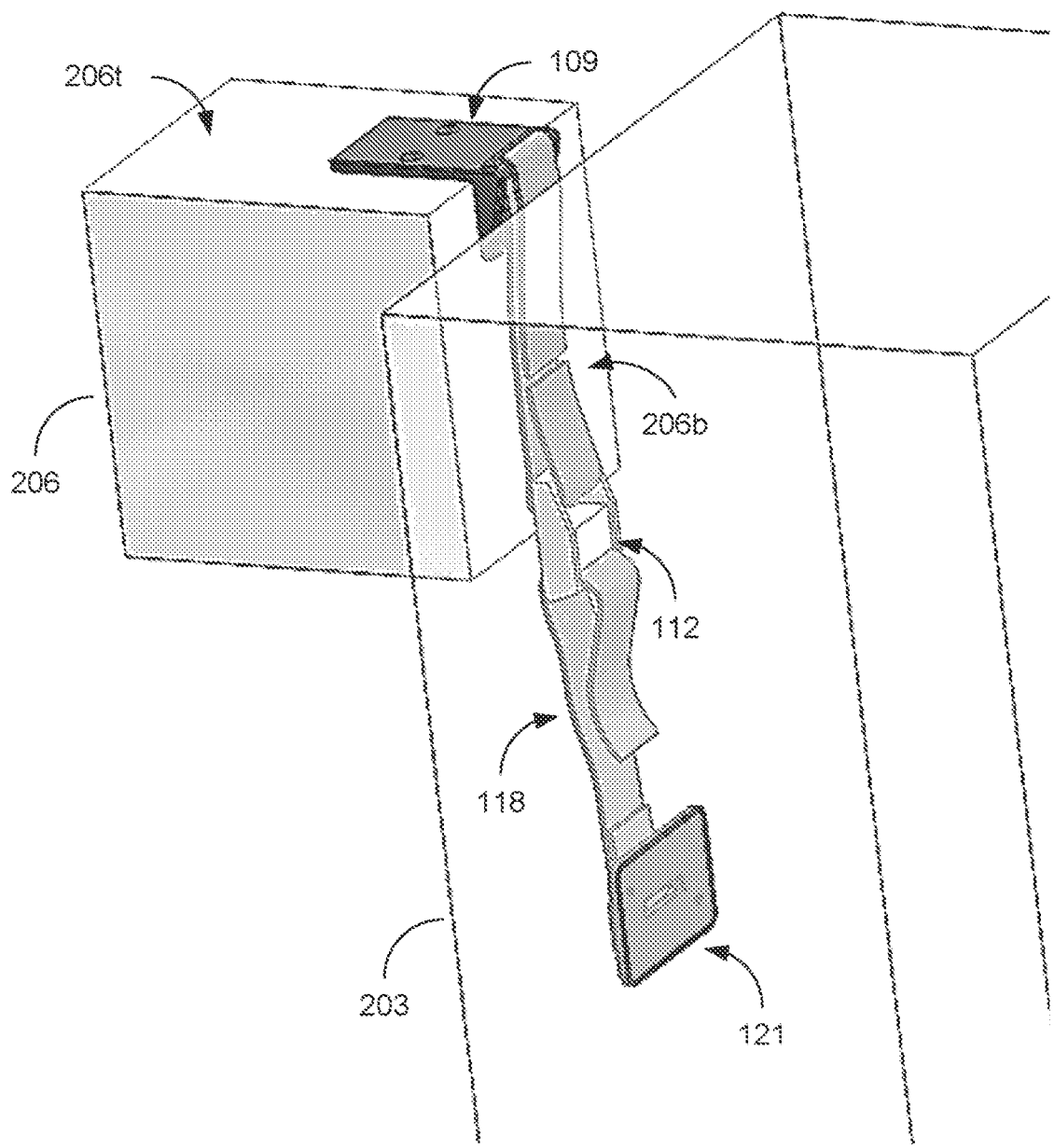
FIGS. 2A through 2C illustrate an example of the installation of the anti-tip system of FIGS. 1A-1I, in accordance with various embodiments of the present disclosure.
Figure 2B:
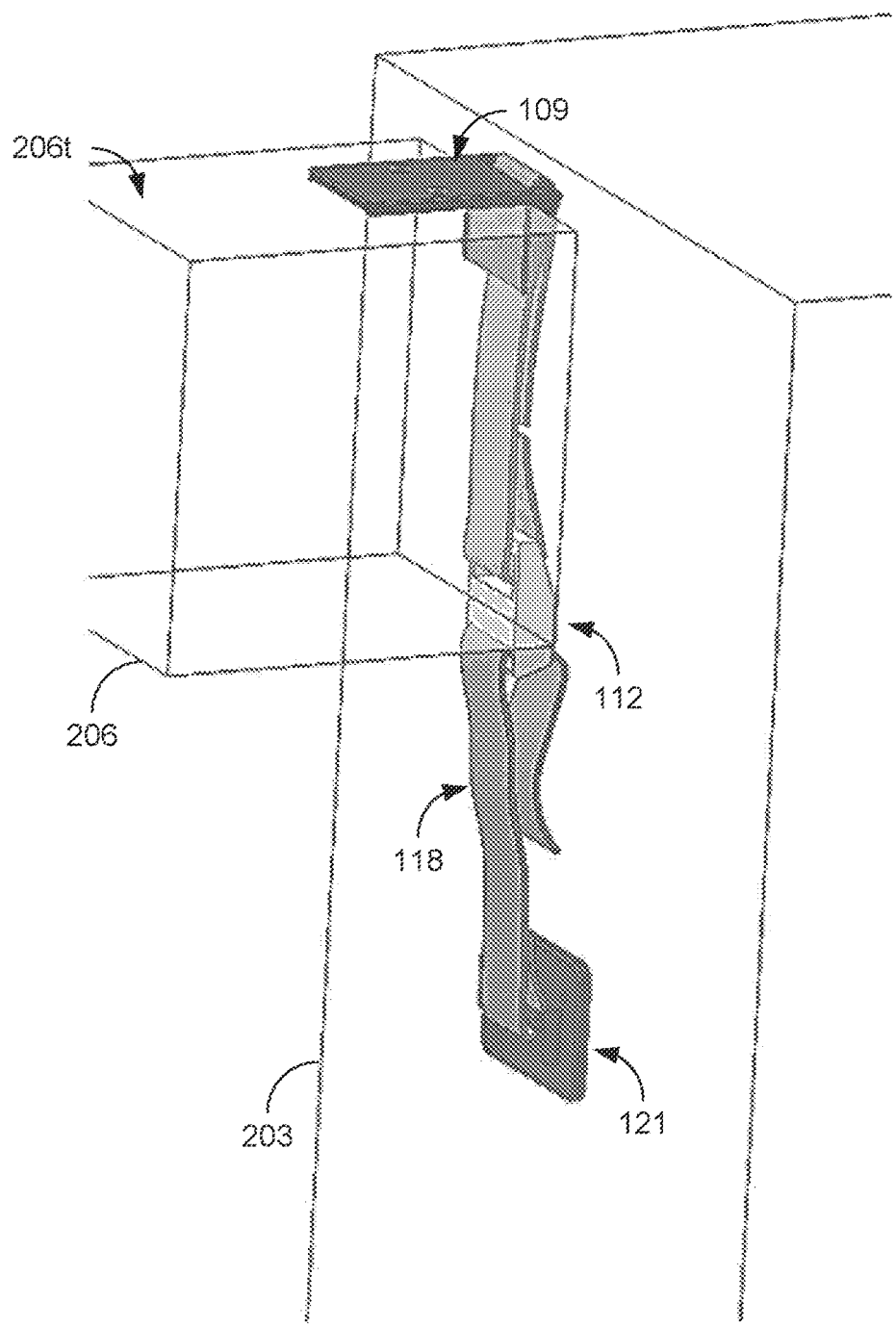
Figure 2C:
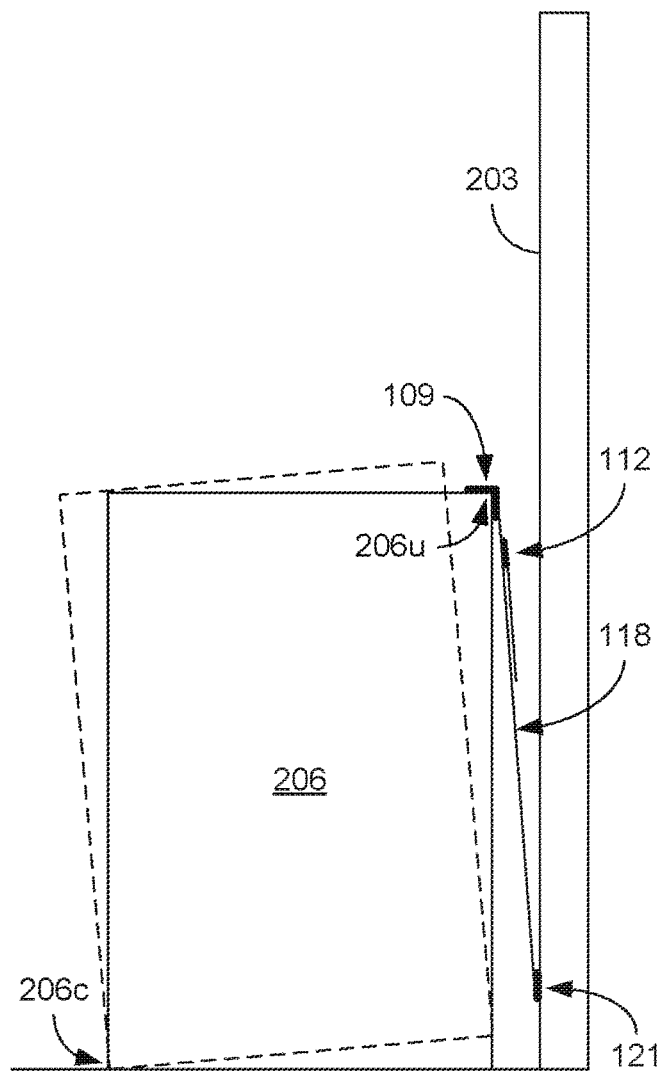

Referring next to FIGS. 2A through 2C, the operation and mounting of the furniture tip over prevention system (or anti-tip system) 100 will be discussed. In the graphical representation of FIGS. 2A and 2B, block 203 represents a portion of a wall 203 against which a piece of furniture would be placed and block 206 represents a portion of the piece of furniture 206 (e.g., dresser, end table, shelves, armoire, desk, etc.) including a top surface 206t and a back surface 206b that would face the wall 203. The furniture mounting unit 103 is secured at the upper rear corner 206u of the piece of furniture 206, located at the intersection of the top surface 206t and the back surface 206b, and the wall anchor plate 121 is secured to a lower section of the wall 203 by the mounting wires 130 (FIGS. 1A-1G), below the top surface 206t of the piece of furniture 206.

As can be understood from FIG. 2C, when a piece of furniture 206 begins to tip over away from the wall 203, the piece of furniture 206 pivots about a lower front corner 206c on the floor causing the upper rear corner 206u to lift upward as it moves away from the wall 203. With the strap 118 held in place by the quick release 112 and appropriately tensioned to remove slack from the strap 118 between the furniture mounting bracket 109 and the wall anchor plate 121, the upper rear corner 206u of the piece of furniture 206 is prevented from moving upward and the furniture 206 is prevented from tipping over. Because the force applied to the wall anchor plate 121 is parallel to the surface of the wall 203, the mounting wires 130 are able to withstand the upward shear force without being pulled from the wall 203.

Figure 3A:
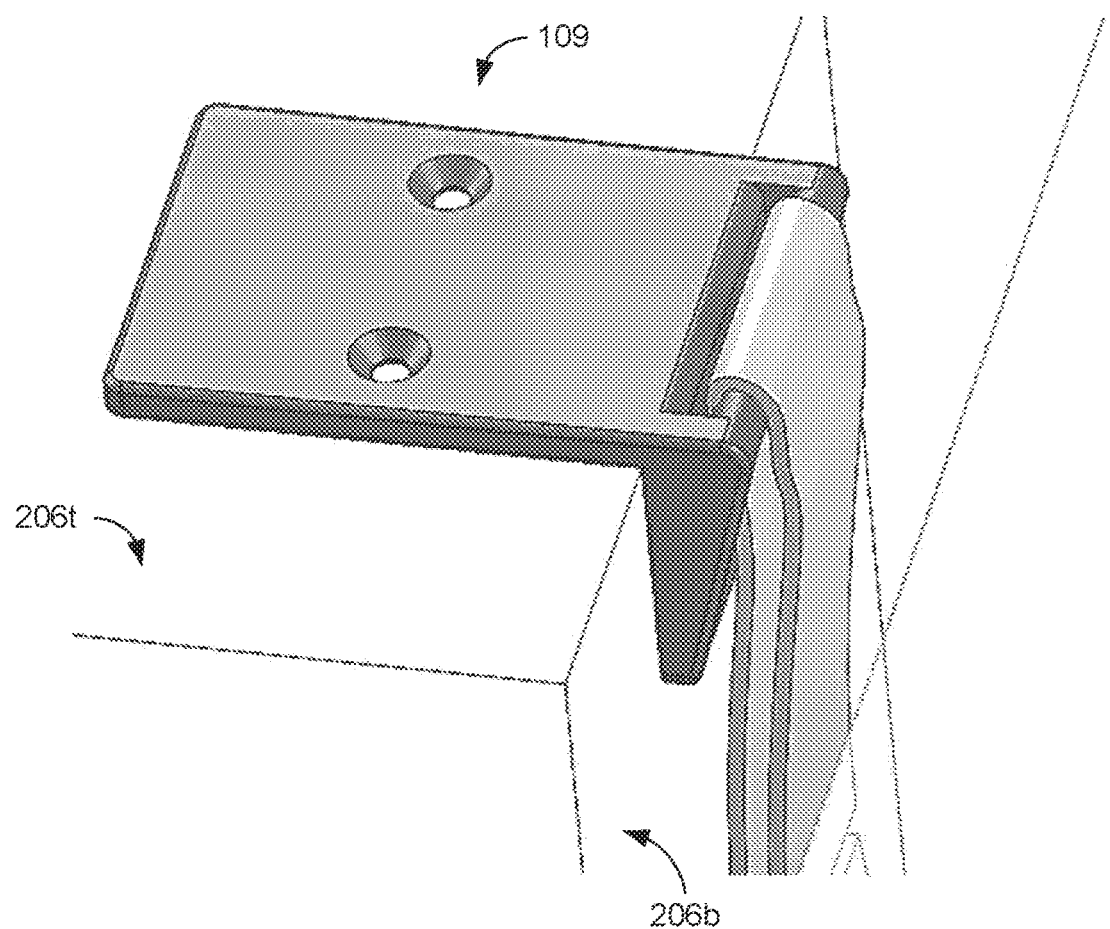
FIGS. 3A through 3D illustrate examples of a furniture mounting bracket of the anti-tip system of FIGS. 1A-1I, in accordance with various embodiments of the present disclosure.

The wall anchor plate 121 can be attached to the wall 203 using the mounting wires 130 as previously discussed. The furniture mounting bracket 109 can be mounted to the piece of furniture 206 in a variety of ways. For example, FIG. 3A shows the horizontal section of the furniture mounting bracket 109 including screw holes to allow the furniture mounting bracket 109 to be secured to the top surface 206t of the furniture 206 using screws or other suitable fastener. However, this can result in undesirable damage to the top surface 206t of the furniture 206.

Figure 3B:
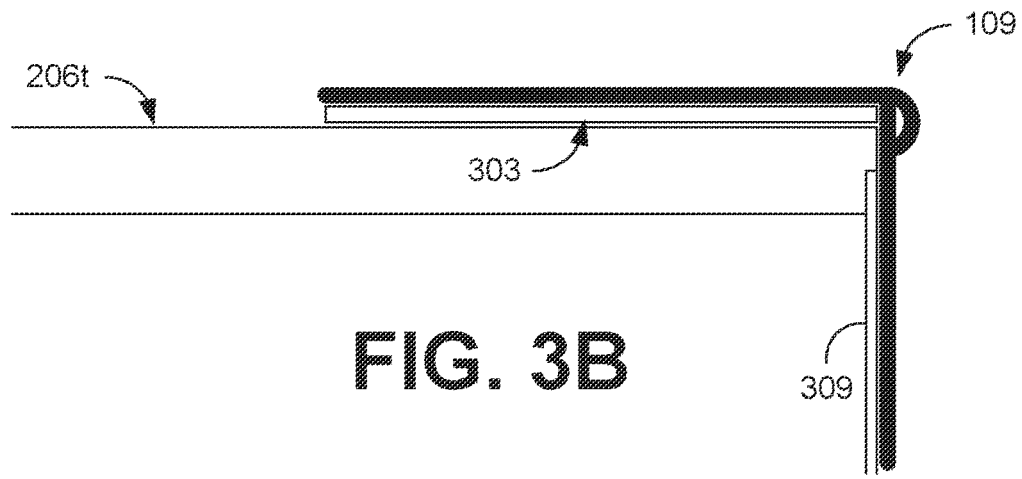
Figure 3C:
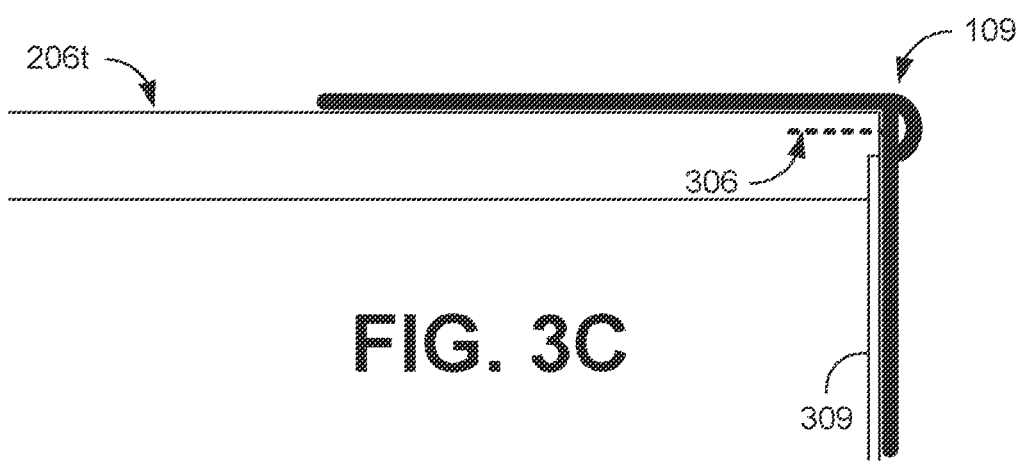
Figure 3D:

FIGS. 3B through 3D are cutaway views illustrating other ways to secure the furniture mounting bracket 109 to the piece of furniture 206. In the example of FIG. 3B, the furniture mounting bracket 109 can be secured to the top surface of the piece of furniture 206 by adhesive 303. As most of the force is downward and perpendicular to the top surface 206t, the adhesive does not need to withstand the full force during tipping. In the example of FIG. 3C, the furniture mounting bracket 109 can be secured to the piece of furniture 206 using a fastener 306 (e.g., screws, nails or other appropriate fastener) that can extend through holes on the vertical section of the furniture mounting bracket 109 into the end of the furniture top.

In the example of FIG. 3D, the horizontal section of the furniture mounting bracket 109 can be reshaped to fit over an edge of the backing panel 309 of the furniture 206. As discussed with respect to the wall anchor plate 121, because the applied force is parallel to the surface of the backing panel 309, the backing panel 309 is able to withstand the downward shear force without being pulled outward from the furniture 206. In some implementations, the backing panel 309 can include one or more prefabricated notches extending below the furniture top to allow the furniture mounting bracket 109 to be inserted into the notch without the need to loosen or modify the backing panel 309 for installation. Similarly, the backing panel 309 may include rectangular openings distributed about the backing panel 309 that would facilitate installation of the furniture mounting brackets 109.

The furniture mounting bracket 109 may be connected to the backing panel 309 in other ways as well. For example, the backing panel 309 may include one or more key holes configured to accept a key or tab of the furniture mounting bracket 109. The opening of the key hole can include a wider section at the top to allow the key or tab to pass through the backing panel 309 and a narrower section at the bottom that would prevent the key or tab from being removed from the backing panel 309. By positioning the key or tab in the narrower section, the furniture mounting bracket 109 can be held in place preventing the furniture from tipping over. The key hole can be reinforced to increase the material strength of the narrower section.

Figure 4A:
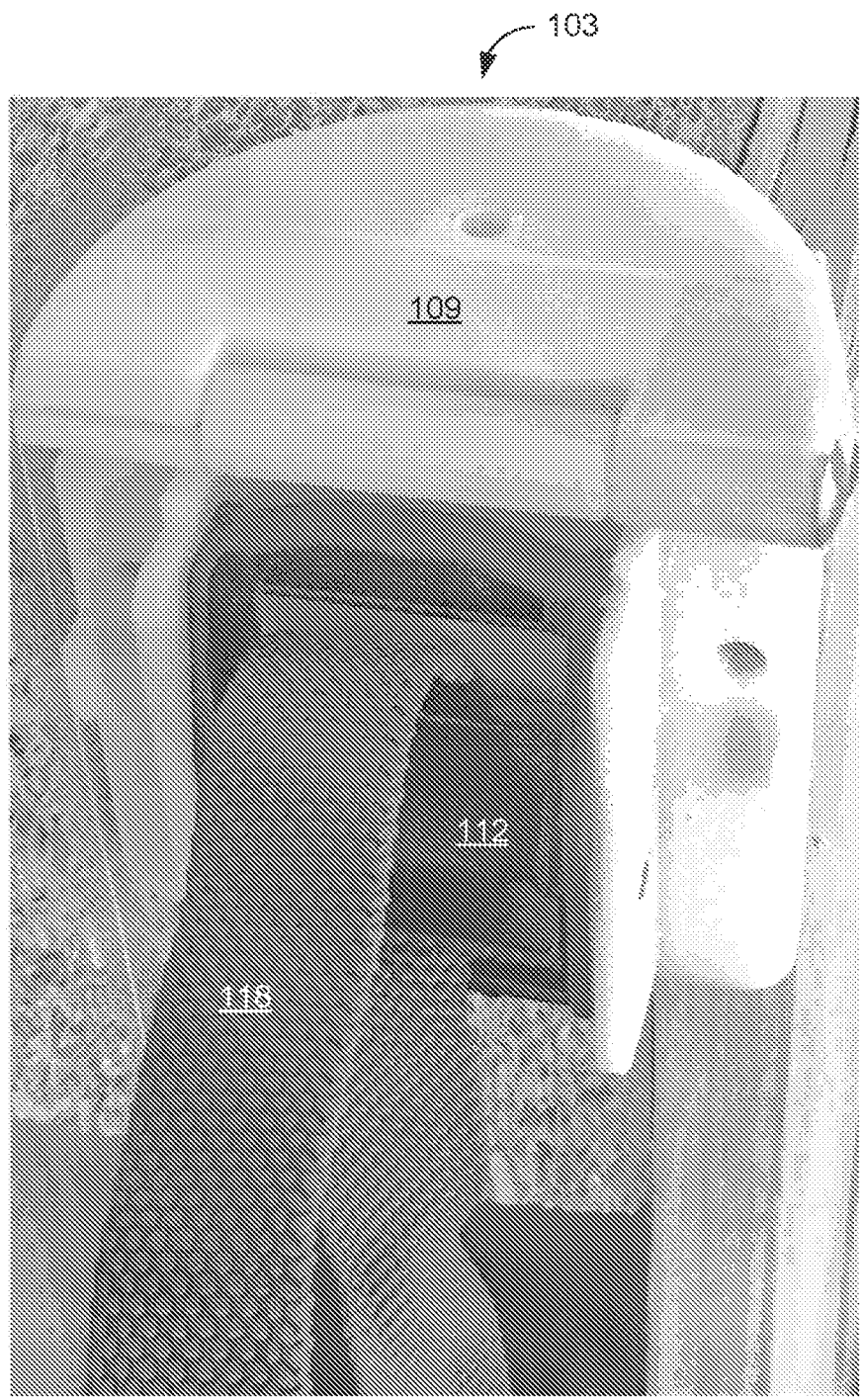
FIGS. 4A through 4O illustrate other examples of the anti-tip system, in accordance with various embodiments of the present disclosure.
Figure 4B:
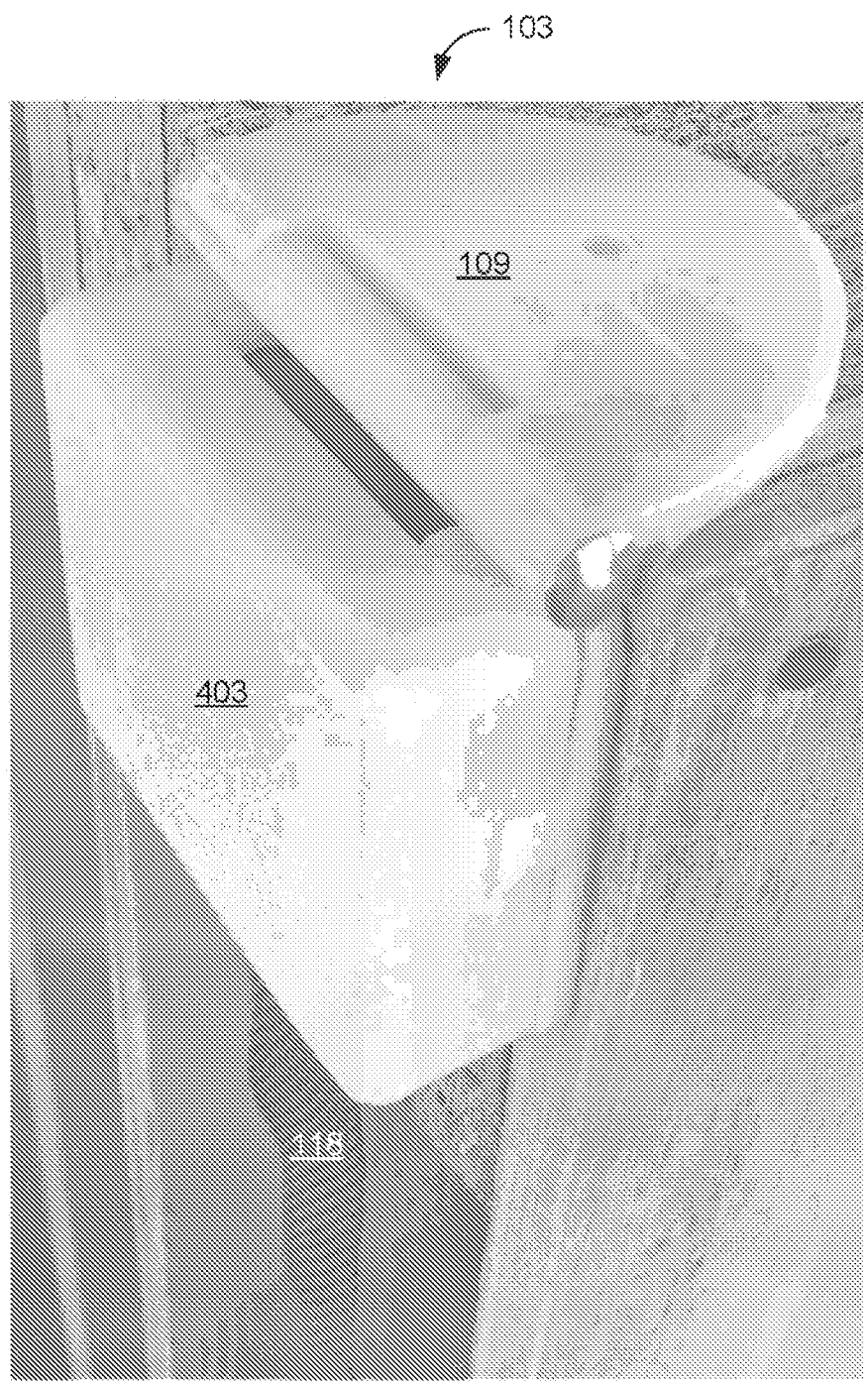

Referring next to FIGS. 4A-4D, shown are images of examples of the anti-tip system 100. The anti-tip system 100 includes a furniture mounting unit 103 and a wall mounting unit 106. FIG. 4A shows an image of an example of the furniture mounting unit 103, which includes a furniture mounting bracket 109 configured to be secured to the upper rear portion of a piece of furniture and a quick release 112 (e.g., a cam lock, snap release buckle, tension fastener, or other suitable secure and release mechanism) attached to the furniture mounting bracket 109. As shown in the example of FIG. 4A, the quick release 112 is directly attached to the furniture mounting bracket 109. As shown, a piece of strap 118 (or other securing device) can pass through the quick release 112. The quick release 112 is configured to receive the strap 118 and hold it in position when tightened. A cover 403 can be positioned over and secured to the mounting bracket 109 to cover the quick release 112, as shown in FIG. 4B. This can be provided as a safety measure to prevent children from accessing the quick release 112 and disconnecting the strap 118, thereby removing the protection provided by the anti-tip system 100. Guides (e.g., tabs and notches) can be provided for proper alignment of the cover 403.

Figure 4C:
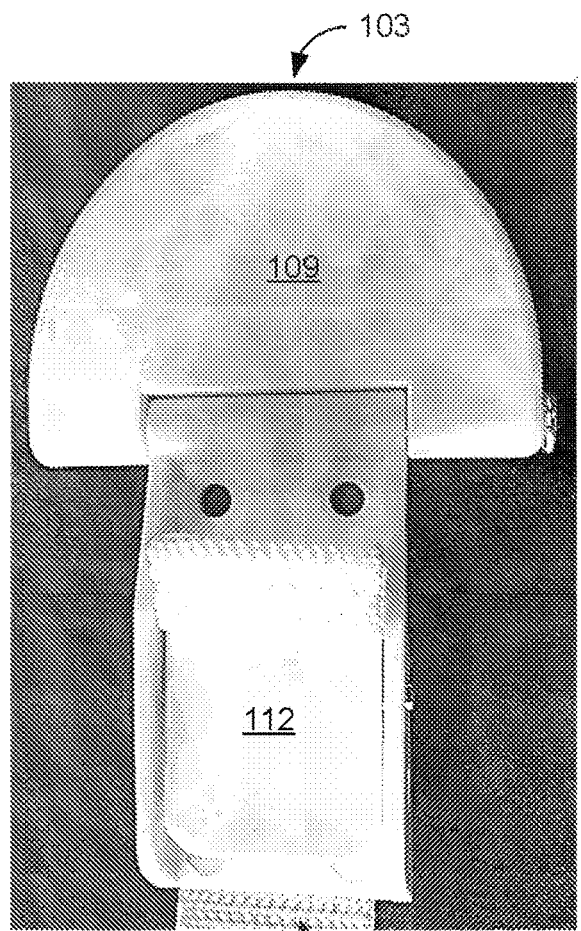
Figure 4D:
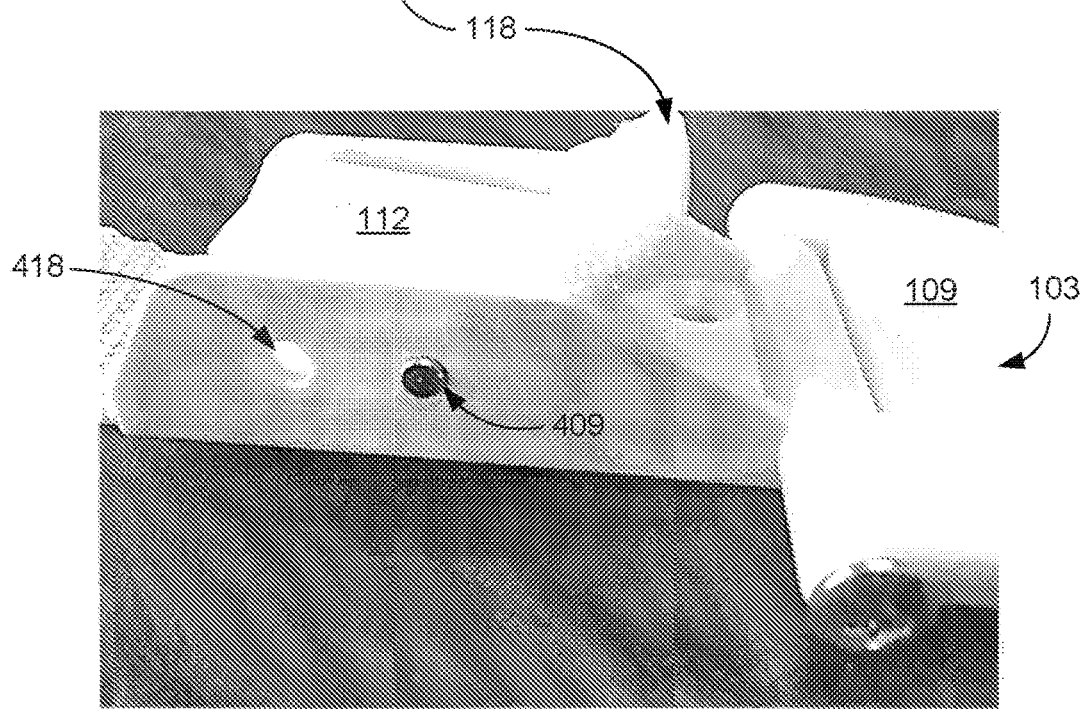
Figure 4E:
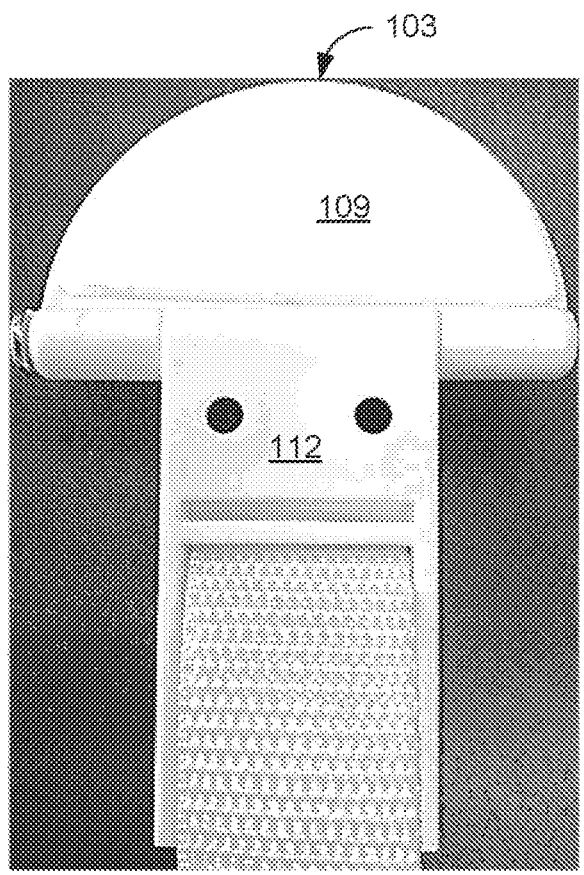
Figure 4F:
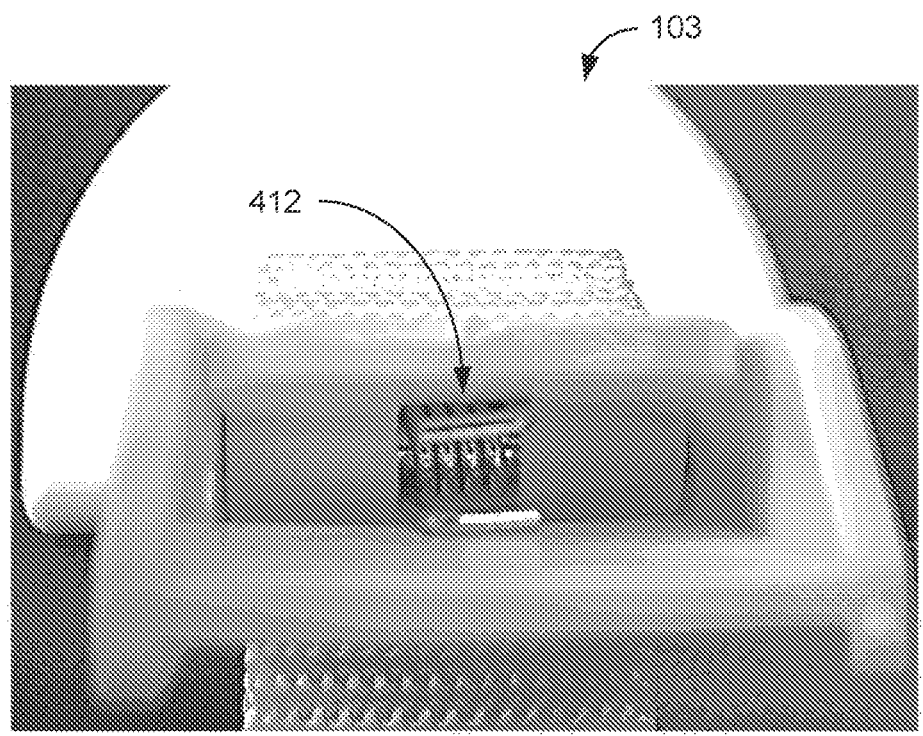
Figure 4G:
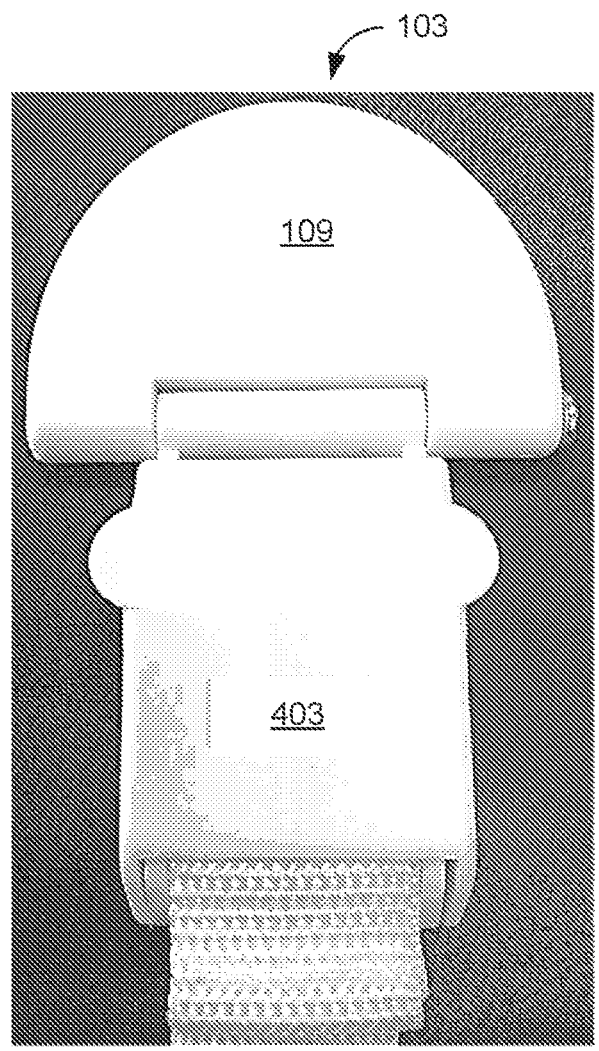
Figure 4H:
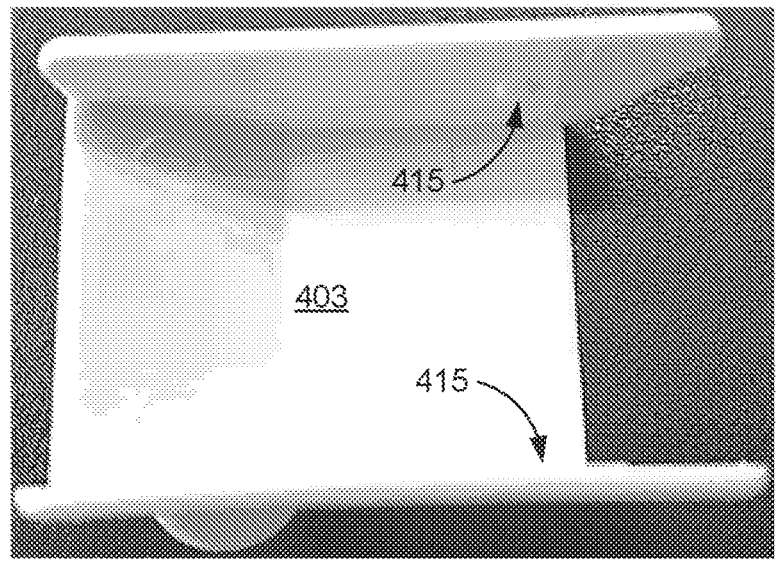

FIGS. 4C-4H show images of another example of the furniture mounting unit 103, which includes a furniture mounting bracket 109 configured to be secured to the upper rear portion of a piece of furniture and a quick release 112 integrated into the furniture mounting bracket 109. FIG. 4C is an image of the front of the furniture mounting bracket 109 and FIG. 4E is an image of the back of the furniture mounting bracket 109. Double sided tape can be included on the top portion of the mounting bracket 109 to facilitate attachment to the piece of furniture 206. As shown, a piece of strap 118 (or other securing device) can pass through the quick release 112. The quick release 112 is configured to receive the strap 118 and hold it in position when tightened. The lever of the quick release 112 is secured to the furniture mounting bracket 109 by pin 409 as shown in FIG. 4D and lever pressure is maintained on the strap 118 by a spring 412 as shown in FIG. 4F. A cover 403 can be positioned over and secured to the mounting bracket 109 to cover the quick release 112, as shown in FIG. 4G. The cover 403 can include tabs 415 as shown in FIG. 4H that are on opposite sides of the inside surface of the cover 403, and that align with holes 418 located on opposite sides of the furniture mounting bracket 109 as shown in FIG. 4D. The combination of tabs 415 and holes 418 can secure the cover 403 in position on the furniture mounting bracket 109.

Figure 4I:
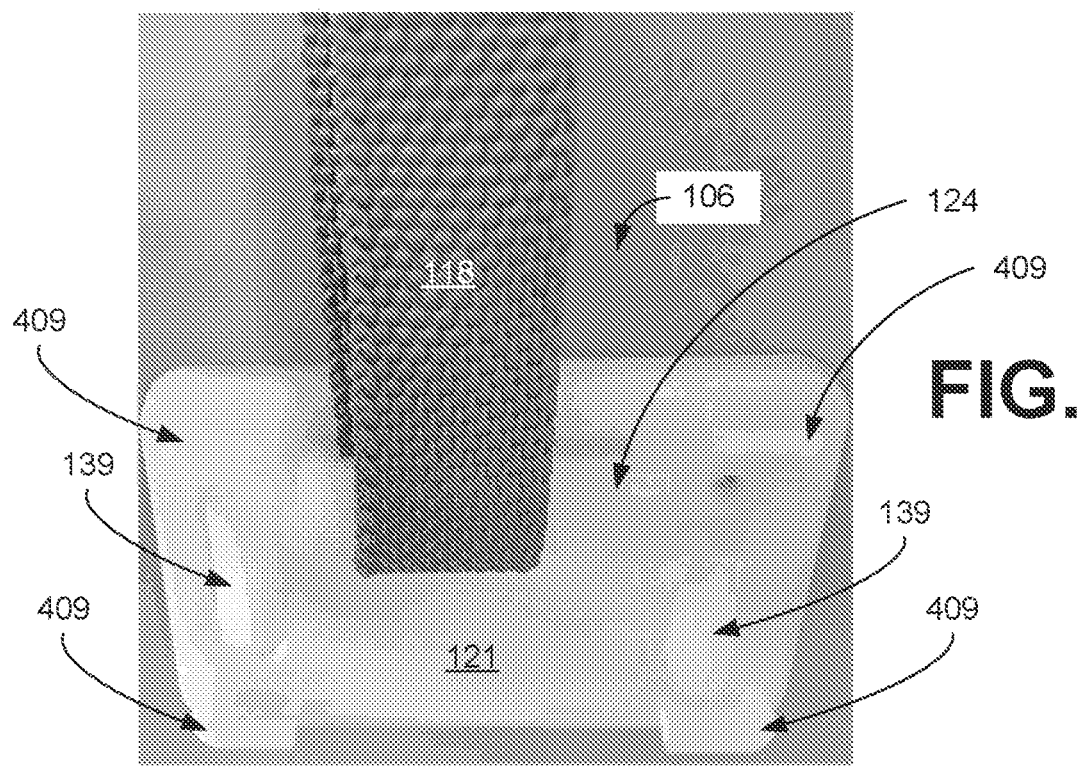
Figure 4J:
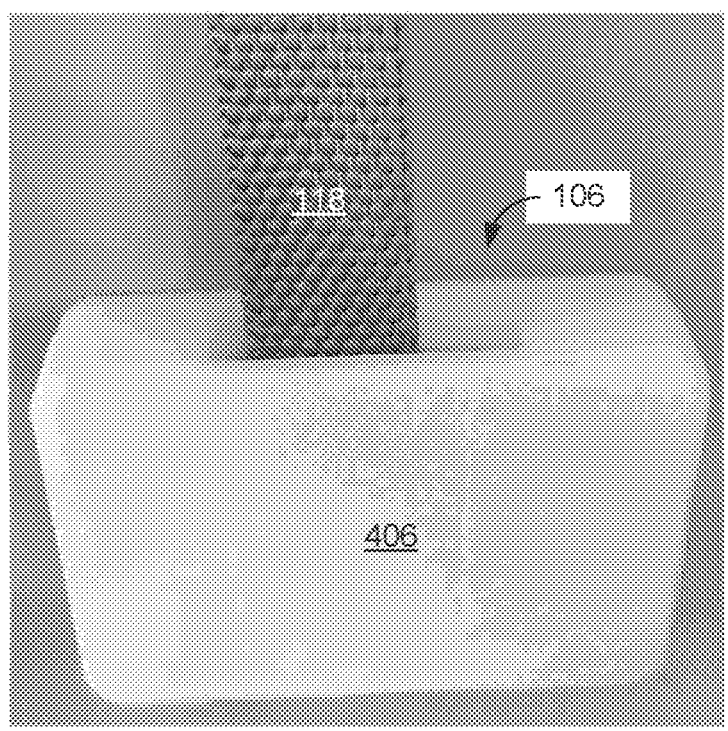
Figure 4K:
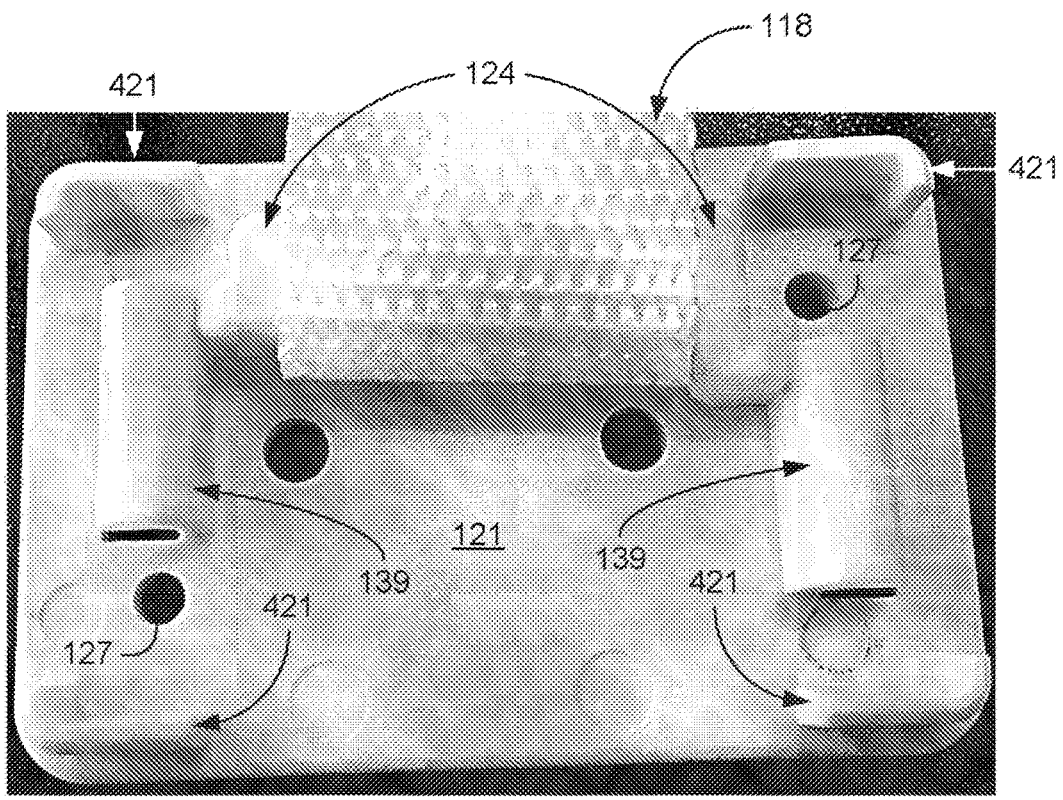
Figure 4L:
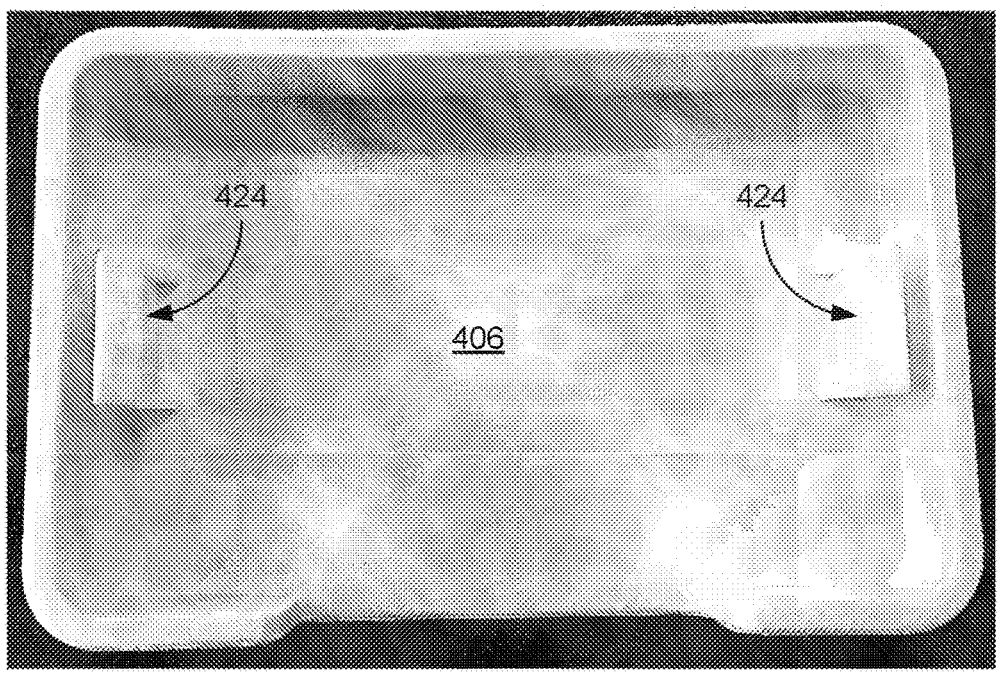
Figure 4M:
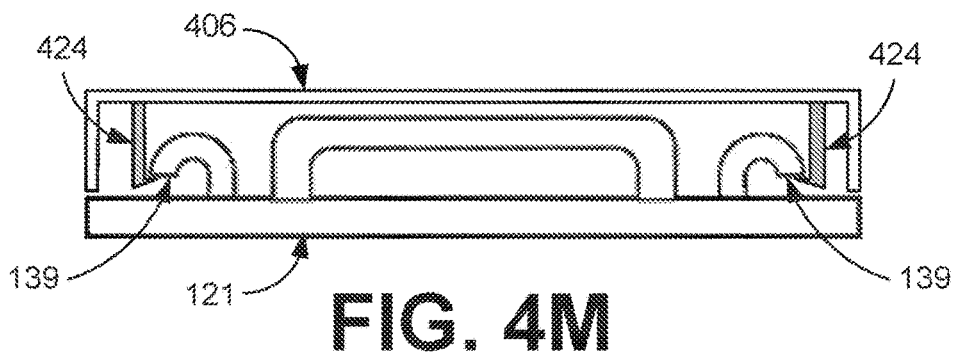
Figure 4N:
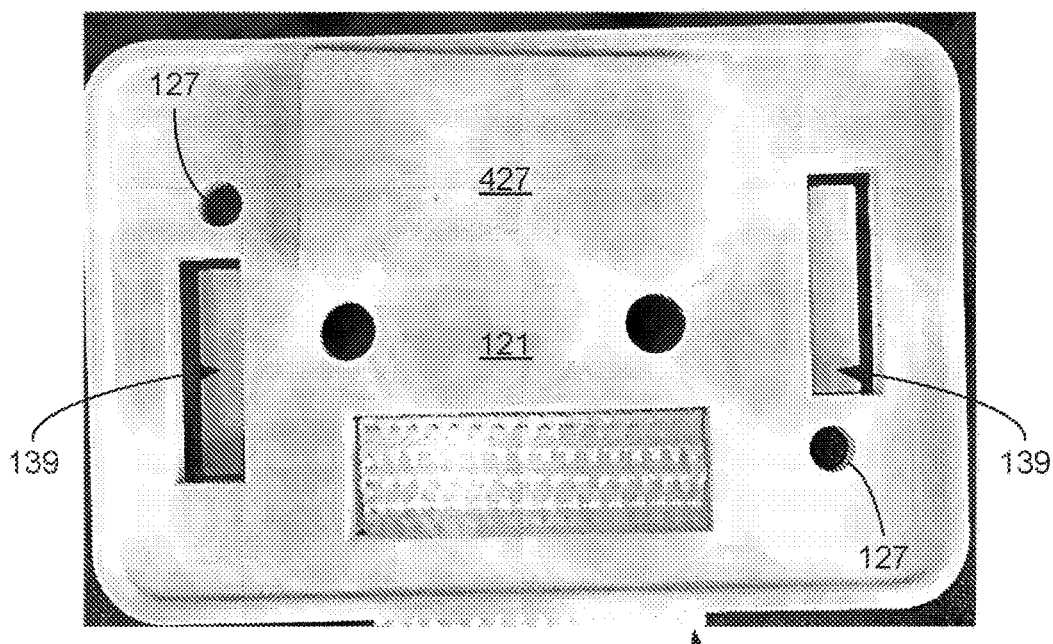
Figure 4O:
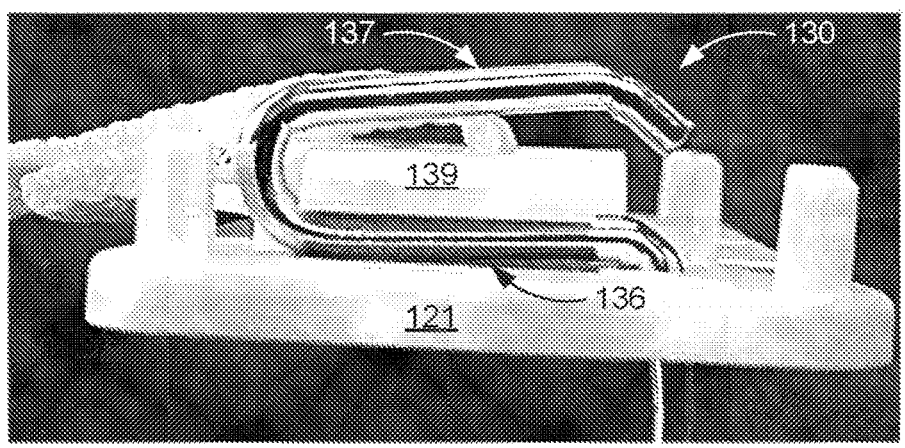

As shown in the image of FIG. 4I, the wall mounting unit 106 includes the strap 118 (or other securing device) attached to a wall anchor plate 121. The strap 118 can be attached to the wall anchor plate 121 by, e.g., a cross-bar 124 extending across a portion of the wall anchor plate 121 as shown in FIG. 4I. In some implementations, the strap 118 can be folded over the cross-bar 124 and sewn to secure the strap 118 on the cross-bar 124. A cover 406 can be positioned over and secured to the wall anchor plate 121 to cover the cross-bar 124 and strap 118, as shown in FIG. 4J. Guides or shoulders 421 (or other appropriate alignment feature) can be located at two or more corners of the wall anchor plate 121 as shown in FIG. 4K to facilitate alignment of the cover 406 when secured in position over the wall anchor plate 121. The cover 406 can include tabs or clips 424 on the inside of the cover 406 that engage with the outer edge of the clamps 139 to attach the cover 406 to the wall anchor plate 121 as shown in FIG. 4L. FIG. 4M is a cross-sectional view illustrating how the tabs or clips 424 engage with the outer edge of the clamps 139. FIG. 4N is an image of the back of the wall anchor plate 121. A piece of double sided tape 427 may be used to facilitate mounting to the wall. FIG. 4O illustrates one of the mounting wires 130 extending through the opening 127 (FIG. 4N) in the wall anchor plate 121 with the first straight portion 136 clipped under the clamp 139 and the second straight portion 137 secured over the clamp 139.

Figure 5A:
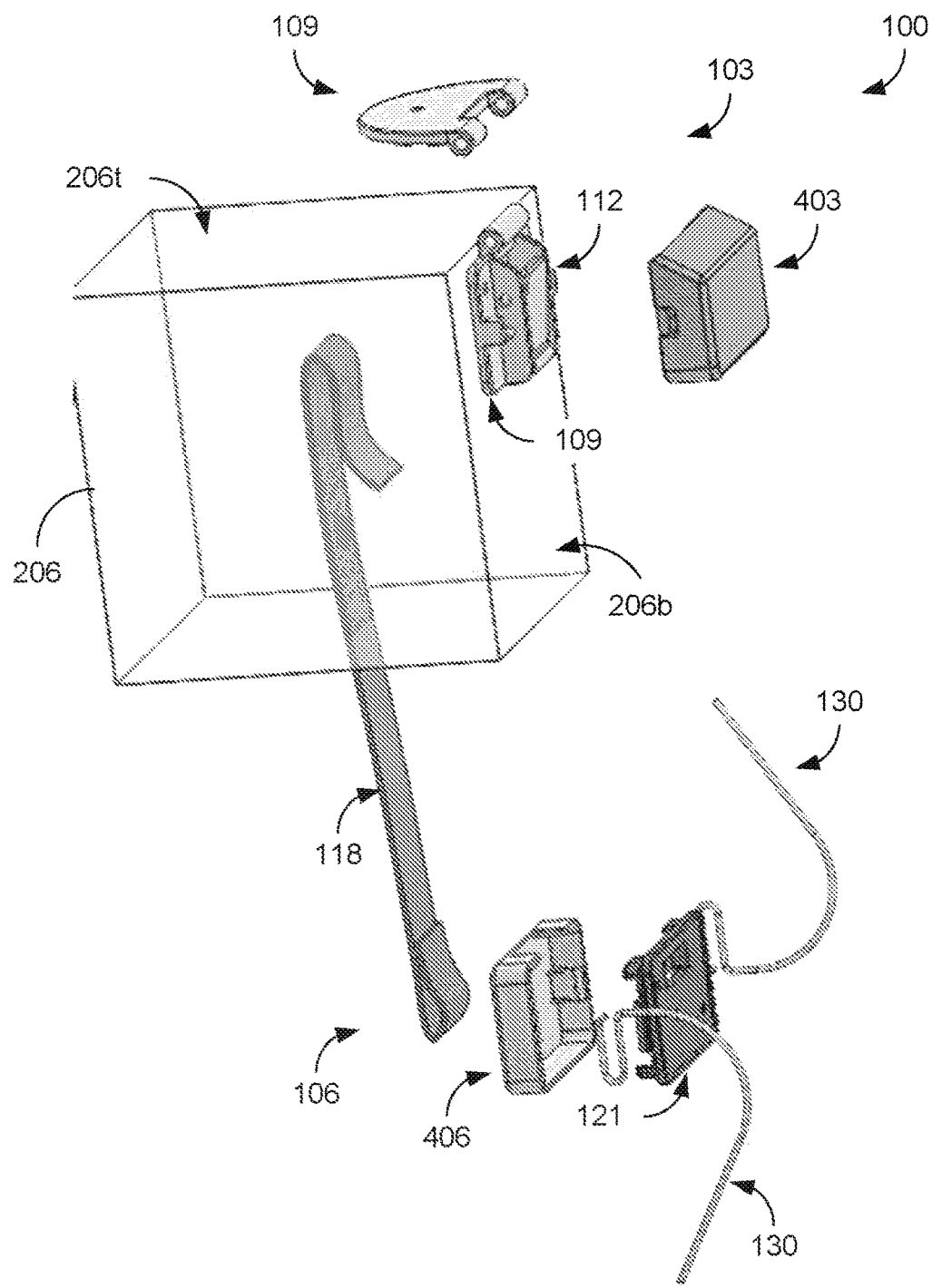
FIGS. 5A through 5D graphically represent an example of the components and configuration of the anti-tip system of FIGS. 4A-4D, in accordance with various embodiments of the present disclosure.
Figure 5B:
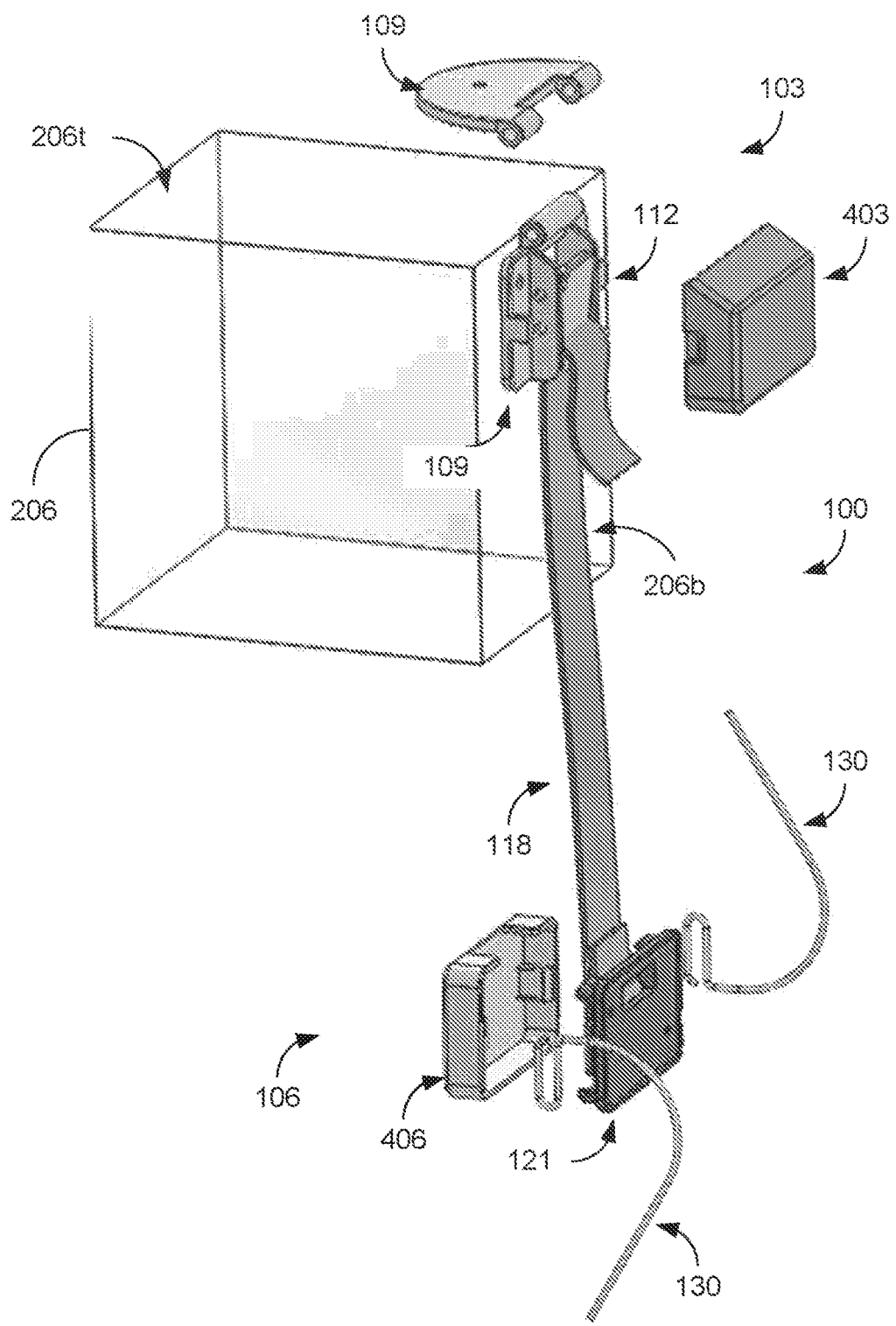
Figure 5C:
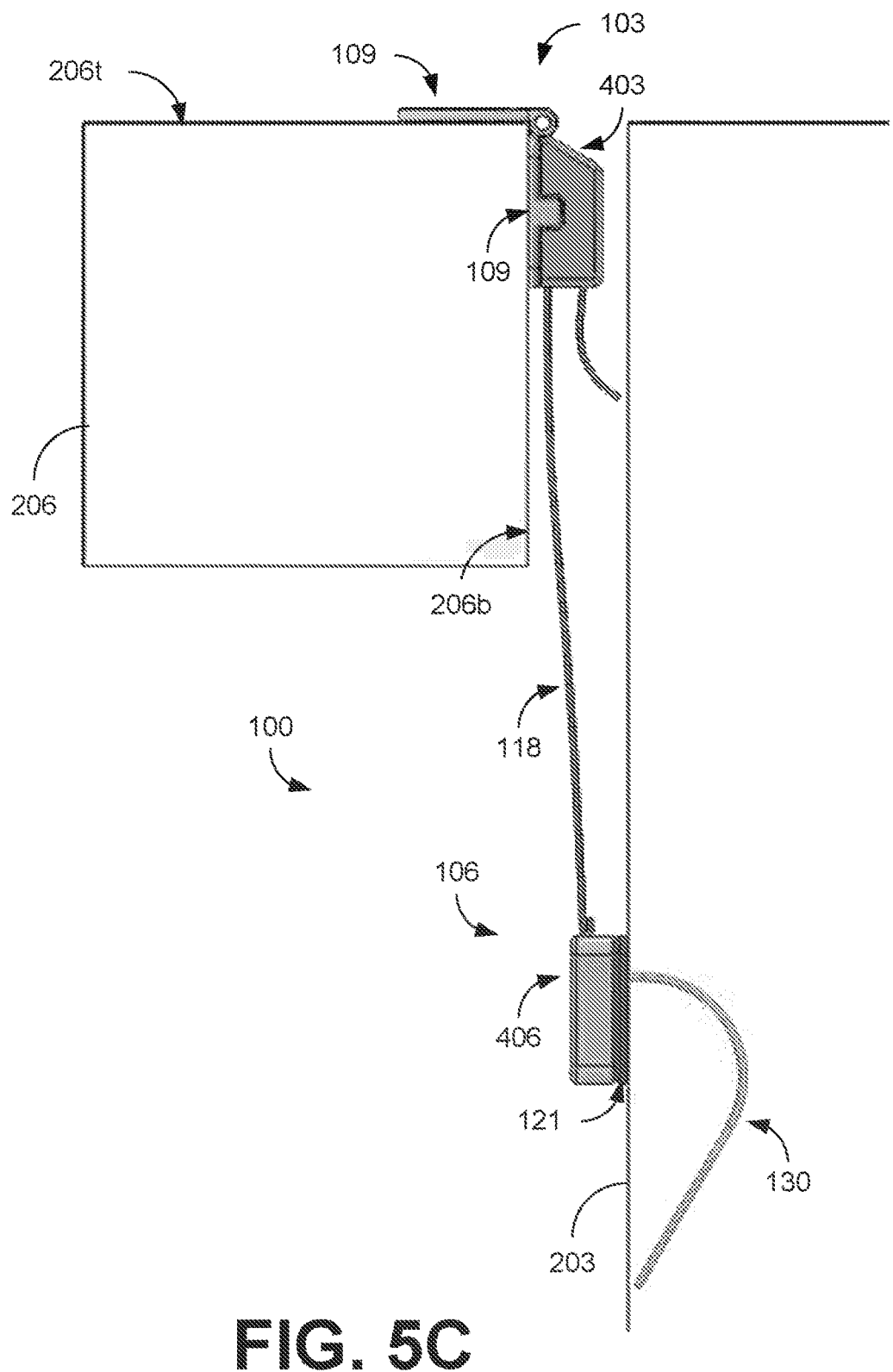
Figure 5D:
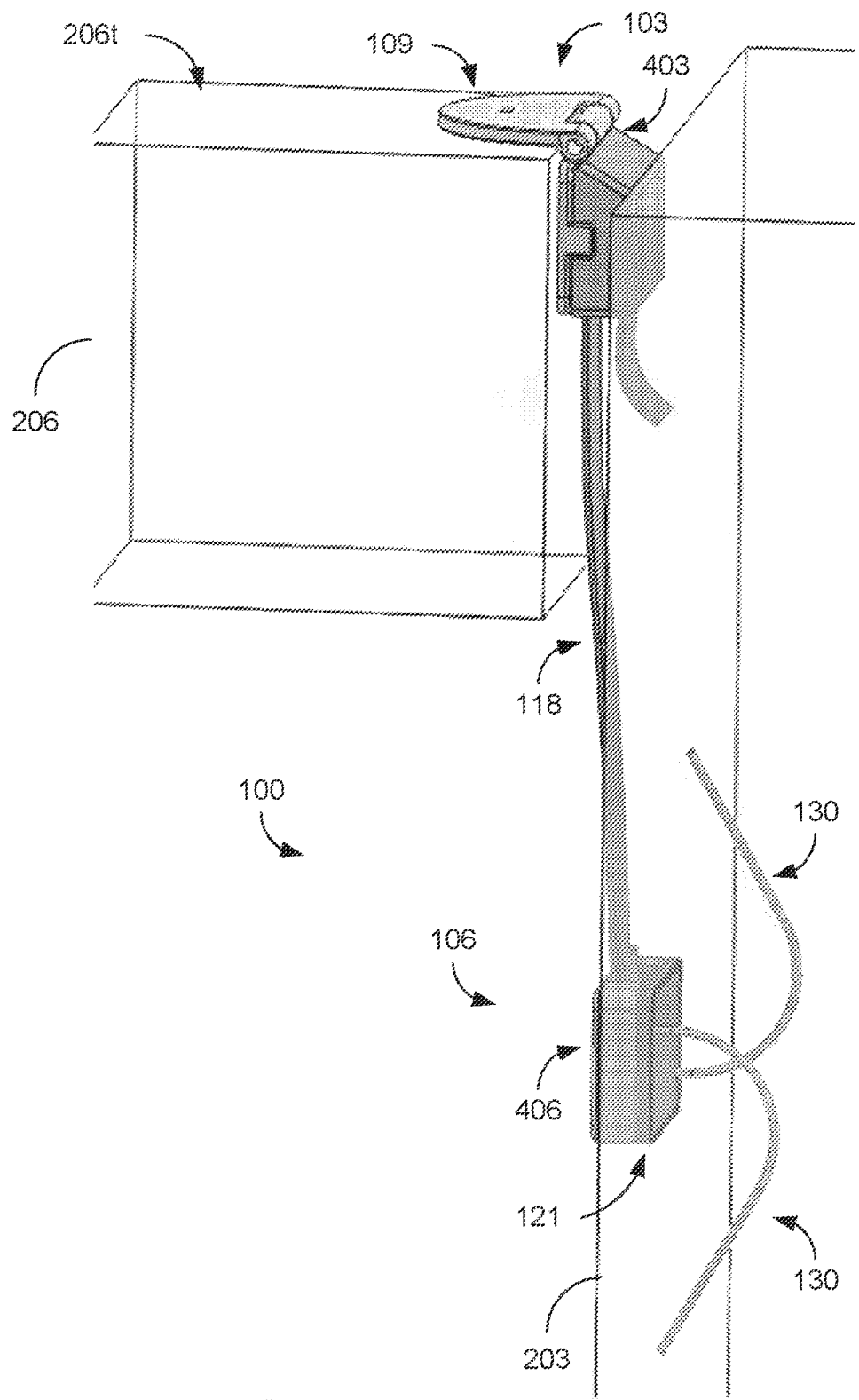

Referring next to FIGS. 5A through 5D, the operation and mounting of the furniture tip over prevention system (or anti-tip system) 100 will be discussed. In the graphical representation of FIGS. 5A and 5B, block 206 represents a portion of the piece of furniture 206 (e.g., dresser, end table, shelves, armoire, desk, etc.) including a top surface 206t and a back surface 206b that would face a wall 203 (FIGS. 5C and 5D). The furniture mounting unit 103 is secured at the upper rear corner of the piece of furniture 206, located at the intersection of the top surface 206t and the back surface 206b, and the wall anchor plate 121 can be secured to a lower section of the wall 203 by the mounting wires 130, below the top surface 206t of the piece of furniture 206.

As illustrated in FIG. 5A, the furniture mounting bracket 109 can comprise two pieces, which can be coupled together by a pin or other appropriate fastener. An upper horizontal section aligns with the top surface 206t of the piece of furniture 206 and a lower vertical section aligns with the back surface 206b of the piece of furniture 206. The furniture mounting bracket 109 can be mounted to the piece of furniture 206 in a variety of ways. For example, the lower vertical section of the furniture mounting bracket 109 can include screw holes to allow the furniture mounting bracket 109 to be secured to the back surface 206b of the furniture 206 using screws or other suitable fastener. The upper horizontal section may be used to align the furniture mounting bracket 109 on the top surface 206t of the piece of furniture 206, and may be detached and removed after the lower vertical section is secured to the back surface 206b of the piece of furniture 206 using an appropriate fastener. In other implementations, the upper horizontal section of the furniture mounting bracket 109 may be secured to the top surface 206t of the piece of furniture 206, or both the upper horizontal section and the lower vertical section may be secured to the piece of furniture 206 utilizing a suitable fastener.

The wall anchor plate 121 can be attached to a wall 203 against which the piece of furniture 206 would be placed, as illustrated in FIGS. 5C and 5D, using the mounting wires 130. The wall anchor plate 121 includes holes or openings to allow mounting wires 130 to pass through the wall anchor plate 121 and enter the drywall (plasterboard, wallboard, or gypsum board) of the wall 203 to secure the wall anchor plate 121 in place. As illustrated in FIGS. 5A-5D, a mounting wire 130 includes a curved section that extends through the drywall and a straight section that is substantially perpendicular to the end of the curved section. As shown in FIGS. 5A and 5B, the straight section may be configured to fold back over itself. During installation of the wall mounting unit 106, the free end of the curved section opposite to the straight section is aligned with an opening in the wall anchor plate 121 and forced through the drywall until the straight section is flush with the face of the wall anchor plate 121. With the curved section inserted through the drywall, the free end of the curved section presses against the back of the drywall as shown in FIGS. 5C and 5D.

The straight section 136 can then be clipped behind (or under) clamps 139 (FIG. 4O) on the wall anchor plate 121 to secure the mounting wire 130, and thus the wall anchor plate 121, in position on the wall. The mounting wire 130 in FIGS. 5A-5D comprises a single straight portion that fits under the clamp 139. The mounting wire 130 in FIGS. 5A and 5B adds a second straight portion in parallel with the first straight portion. The second straight portion can fit over the clamp 139 to facilitate removal of the mounting wire 130 from the clamp 139. Other arrangements may also be possible. With the straight section 136 clamped in place, the two mounting wires 130 hold the wall anchor plate 121 in position on the wall with the curved section 133 of one mounting wire 130 extending upward inside the wall and the curved section 133 of the other mounting wire 130 extending downward inside the wall.

Figure 6A:
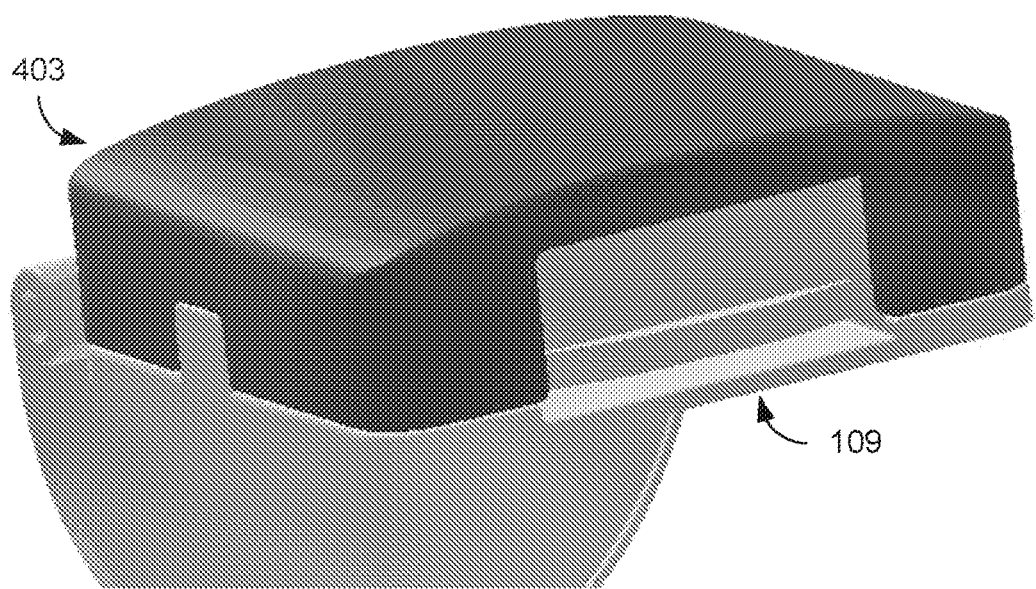
FIGS. 6A and 6B graphically represent examples of mounting covers of the anti-tip system of FIGS. 4A-4D, in accordance with various embodiments of the present disclosure.
Figure 6B:
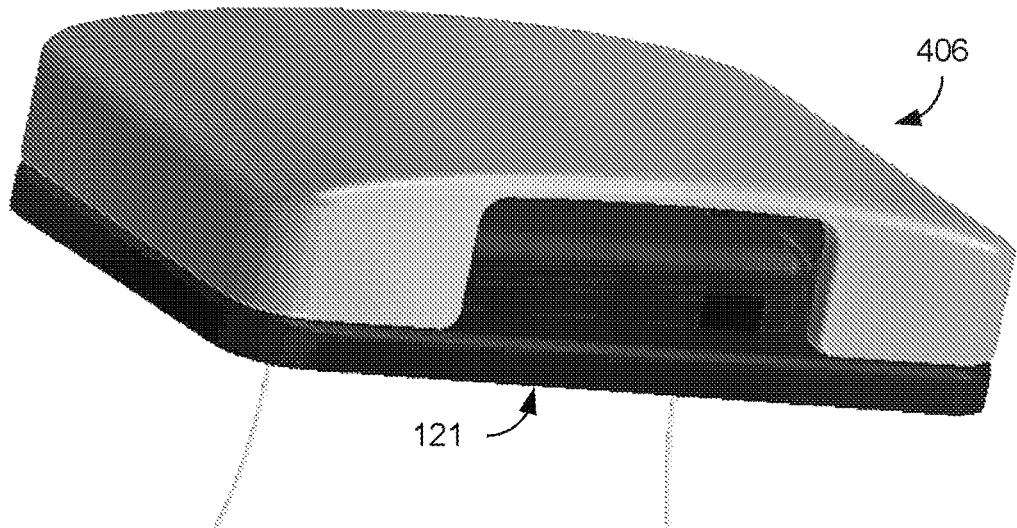

The strap 118 can be attached to the wall anchor plate 121 by, e.g., a cross-bar 124 extending across a center portion of the wall anchor plate 121 as shown in FIG. 4C. For example, the strap 118 can be folded over the cross-bar 124 and sewn to secure the strap 118 on the cross-bar 124. The strap 118 can then be extended to pass through the quick release 112, which secures it to the furniture mounting bracket 109, and tensioned to prevent the piece of furniture 206 from tipping over as previously discussed. Covers 403 and 406 can be secured over the furniture mounting bracket 109 and wall anchor plate 121 to restrict access to the strap 118 and quick release 112. FIG. 6A illustrates an example of the cover 403 for the furniture mounting bracket 109 and FIG. 6B illustrates an example of the cover 406 for the wall anchor plate 121.

In some implementations, the strap 118 may be secured to the wall anchor plate 121 before mounting to the wall 203 and/or may be secured to the furniture mounting bracket 109 before mounting to the piece of furniture 206. In that case, the wall anchor plate 121 can be secured to the wall 203 as previously described, and then the furniture mounting bracket 109 can be secured to the piece of furniture 206. The furniture mounting bracket 109 can be fully extended on the strap 118 to allow as much flexibility as possible. With the furniture mounting bracket 109 attached, the piece of furniture 206 can be repositioned next to the wall and the strap 118 tightened to prevent the piece of furniture 206 from tipping over.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A furniture tip over prevention system, comprising:
   a furniture mounting bracket configured to be secured to a piece of furniture, the furniture mounting bracket comprising a first portion configured to be secured to a top surface of the piece of furniture and a second portion configured to extend along a back surface of the piece of furniture, the second portion comprising a quick release secured to and integrated in the second portion of the furniture mounting bracket;
   a wall anchor plate configured to be secured to an outer surface of a wall adjacent to the back surface of the piece of furniture and below the top surface of the piece of furniture, the wall anchor plate being substantially rectangular and comprising openings in diagonally opposite corners of the wall anchor plate;
   mounting wires configured to secure the wall anchor plate to the wall by passing through a corresponding opening of the openings of the wall anchor plate and extending through a portion of drywall defining the outer surface of the wall, the mounting wires comprising:
      a curved section having a proximal end and a distal end, and
      a straight section extending from the proximal end of the curved section, where the straight section is substantially perpendicular to the proximal end of the curved section and extends toward the distal end of the curved section,
      where the curved section passes through the portion of drywall and engages an inner surface of the wall at the distal end of the curved section with the proximal end of the curved section extending through the corresponding opening of the wall anchor plate, and where the straight section extends from the proximal end of the curved section across an outer surface of the wall anchor plate opposite the curved section within the wall when the wall anchor plate is secured to the wall; and a securing strap attached to the wall anchor plate, where the securing strap attaches to the furniture mounting bracket by passing through the quick release integrated in the second portion of the furniture mounting bracket.

2. The furniture tip over prevention system of claim 1, wherein the straight section of the mounting wires is configured to detachably attach to the wall anchor plate to hold the distal end of the curved section against the inner surface of the wall.

3. The furniture tip over prevention system of claim 2, wherein the straight section engages with a clamp extending from the outer surface of the wall anchor plate to detachably attach that mounting wire to the wall anchor plate.

4. The furniture tip over prevention system of claim 3, wherein the straight section clips under the clamp to detachably attach that mounting wire.

5. The furniture tip over prevention system of claim 3, wherein the mounting wires comprises a second straight section extending over the clamp substantially parallel to and opposite the straight section engaged with the clamp.

6. The furniture tip over prevention system of claim 3, wherein the curved section of a first mounting wire engages the inner surface of the wall on a first side of the wall anchor plate and the curved section of a second mounting wire engages the inner surface of the wall on a second side of the wall anchor plate that is opposite the first side.

7. The furniture tip over prevention system of claim 1, wherein the quick release is a cam lock buckle.

8. The furniture tip over prevention system of claim 1, comprising a cover configured to detachably attach to the furniture mounting bracket, the cover configured to restrict access to the quick release when attached to the furniture mounting bracket.

9. The furniture tip over prevention system of claim 1, wherein the securing strap is attached to a cross-bar of the wall anchor plate.

10. A method, comprising:
securing a substantially rectangular wall anchor plate to a wall, the wall anchor plate secured to the wall using mounting wires that extend through an outer surface of the wall, the mounting wires comprising:
a curved section having a proximal end and a distal end, and
a straight section extending from the proximal end of the curved section, where the straight section is substantially perpendicular to the proximal end of the curved section and extends toward the distal end of the curved section,
where the wall anchor plate is secured by passing the curved section of the mounting wires through corresponding openings in diagonally opposite corners of the wall anchor plate and then through a portion of drywall, where the mounting wires are inserted though the corresponding openings in the wall anchor plate and the drywall with the proximal end of the curved section extending through the corresponding openings of the wall anchor plate and the distal end of the curved section engaged with an inner surface of the wall, where the straight section is rotated to secure the straight section of the mounting wires across an outer surface of the wall anchor plate opposite the curved section within the wall;

attaching a furniture mounting bracket comprising first and second portions to a piece of furniture, the second portion comprising a quick release secured to and integrated in the second portion of the furniture mounting bracket, where the first portion of the furniture mounting bracket is secured to a top surface of the piece of furniture and the second portion of the furniture mounting bracket extends along a back surface of the piece of furniture, where a securing strap is attached between the wall anchor plate and the furniture mounting bracket, where the securing strap attaches to the furniture mounting bracket by passing through the quick release integrated in the second portion of the furniture mounting bracket;

positioning the piece of furniture adjacent to the wall anchor plate; and tensioning the securing strap attached between the wall anchor plate and the furniture mounting bracket, the tensioned securing strap providing a downward force on the piece of furniture thereby preventing the piece of furniture from tipping over.

11. The method of any of claim 10, wherein the second portion of the furniture mounting bracket is secured to the back surface adjacent to the top surface of the piece of furniture and the wall anchor plate is secured to the wall at a location adjacent to the back of the piece of furniture and below the top of the piece of furniture.

12. The method of claim 11, wherein the furniture mounting bracket is positioned above the wall anchor plate.

13. The furniture tip over prevention system of claim 1, wherein the first portion and the second portion of the furniture mounting bracket are pivotally connected.

14. The furniture tip over prevention system of claim 1, wherein the quick release comprises a lever secured to the furniture mounting bracket, and a spring positioned between the lever and the second portion of the furniture mounting bracket and configured to apply lever pressure to the securing strap via the lever.

15. The method of claim 10, wherein the straight section of the mounting wires engages with a clamp extending from the outer surface of the wall anchor plate to detachably attach that mounting wire to the wall anchor plate and hold the distal end of the curved section against the inner surface of the wall.

16. The method of claim 14, wherein the mounting wires comprises a second straight section extending over the clamp substantially parallel to and opposite the straight section engaged with the clamp.

17. The method of claim 14, wherein the curved section of a first mounting wire engages the inner surface of the wall on a first side of the wall anchor plate and the curved section of a second mounting wire engages the inner surface of the wall on a second side of the wall anchor plate that is opposite the first side.

18. The method of claim 10, wherein the quick release is a cam lock buckle.

19. The method of claim 10, wherein the quick release comprises a lever secured to the furniture mounting bracket, and a spring positioned between the lever and the second portion of the furniture mounting bracket and configured to apply lever pressure to the securing strap via the lever.

20. The method of claim 10, wherein the first portion and the second portion of the furniture mounting bracket are pivotally connected.

* * * * *